US012076759B2

(12) United States Patent
Larsson et al.

(10) Patent No.: US 12,076,759 B2
(45) Date of Patent: Sep. 3, 2024

(54) AIRCRAFT CLEANING ROBOT

(71) Applicant: NORDIC AEROWASH EQUIPMENT AB, Gävle (SE)

(72) Inventors: Anders Larsson, Stockholm (SE); Johan Åberg, Gävle (SE)

(73) Assignee: NORDIC AEROWASH EQUIPMENT AB, Gävle (SE)

( * ) Notice: Subject to any disclaimer, the term of this patent is extended or adjusted under 35 U.S.C. 154(b) by 723 days.

(21) Appl. No.: 16/640,624

(22) PCT Filed: Aug. 17, 2018

(86) PCT No.: PCT/SE2018/050833
§ 371 (c)(1),
(2) Date: Feb. 20, 2020

(87) PCT Pub. No.: WO2019/039988
PCT Pub. Date: Feb. 28, 2019

(65) Prior Publication Data
US 2020/0353511 A1    Nov. 12, 2020

(30) Foreign Application Priority Data

Aug. 20, 2017 (SE) .................................. 1751008-2
Sep. 19, 2017 (SE) .................................. 1751160-1

(51) Int. Cl.
B08B 13/00    (2006.01)
B08B 1/12    (2024.01)
(Continued)

(52) U.S. Cl.
CPC ................ B08B 1/32 (2024.01); *B08B 1/12* (2024.01); *B08B 3/08* (2013.01); *B08B 13/00* (2013.01);
(Continued)

(58) Field of Classification Search
CPC ............. B08B 1/04; B08B 1/002; B08B 3/08; B08B 13/00; B25J 5/007; B25J 11/0085; B64F 5/30
See application file for complete search history.

(56) References Cited

U.S. PATENT DOCUMENTS

| 3,835,498 A | 9/1974 | Arato |
| 4,724,565 A | 2/1988 | Higaki et al. |
| 5,115,531 A | 5/1992 | Suzuki |

(Continued)

FOREIGN PATENT DOCUMENTS

| CN | 103895875 A | 7/2014 |
| CN | 103862451 A | 6/2018 |

(Continued)

OTHER PUBLICATIONS

Machine translation of WO 96/02365 (Year: 1996).*
(Continued)

Primary Examiner — Erin F Bergner
(74) Attorney, Agent, or Firm — BURR & FORMAN LLP

(57) ABSTRACT

An aircraft cleaning robot comprises a robot arm (14); a brush (34) rotatably attached to the robot arm (14) to be rotated about a brush rotation axis (R); and a controller (56) configured to control the position of the cleaning head (32), wherein the aircraft cleaning robot (10) is configured to automatically orient the brush (34) such that a cleaning face (37) of the cleaning head (32) is aligned with the surface being brushed; and the controller (56) is configured to, based on input from the robot arm (14) and/or cleaning head (32), determine a cleaning direction in which the cleaning face (37) is presently facing; and, based on the determined cleaning direction, operate the robot arm (14) along the cleaning direction to apply a brush engagement pressure in said cleaning direction.

19 Claims, 9 Drawing Sheets

(51) Int. Cl.
  *B08B 1/32* (2024.01)
  *B08B 3/08* (2006.01)
  *B25J 5/00* (2006.01)
  *B25J 11/00* (2006.01)
  *B64F 5/30* (2017.01)

(52) U.S. Cl.
  CPC ........... *B25J 5/007* (2013.01); *B25J 11/0085* (2013.01); *B64F 5/30* (2017.01)

(56) References Cited

U.S. PATENT DOCUMENTS

| | | | |
|---|---|---|---|
| 5,720,069 | A | 2/1998 | Wanner et al. |
| 5,769,954 | A | 6/1998 | Wanner et al. |
| 5,833,762 | A | 11/1998 | Wanner et al. |
| 5,979,001 | A | 11/1999 | Marrero |
| 6,134,734 | A | 10/2000 | Marrero |
| 6,189,473 | B1 | 2/2001 | Appel et al. |
| 2002/0148683 | A1 | 10/2002 | Donaldson et al. |
| 2013/0310982 | A1 | 11/2013 | Scheurer et al. |
| 2019/0262966 | A1 * | 8/2019 | Scafutto Scotton ......................... B25J 11/0065 |

FOREIGN PATENT DOCUMENTS

| | | | |
|---|---|---|---|
| DE | 2701823 | A1 | 8/1977 |
| EP | 0404684 | A1 | 12/1990 |
| GB | 2391799 | A | 2/2004 |
| GB | 2539661 | A | 12/2016 |
| JP | H0732283 | A | 2/1995 |
| WO | WO-9602365 | A1 * | 2/1996 ............ B25J 9/1689 |
| WO | 0036904 | A1 | 6/2000 |

OTHER PUBLICATIONS

International Search Report and Written Opinion mailed on Oct. 17, 2018 in the international application PCT/ SE2018/050833, all pages cited in it's entirety.

Swedish Search Report and Written Opinion from related Swedish application No. 1751008-2 dated Apr. 11. 2018, all pages cited in its entirety.

Swedish Search Report and Written Opinion from related Swedish application No. 1471160-1 dated Apr. 27, 2018, all pages cited in its entirety.

* cited by examiner

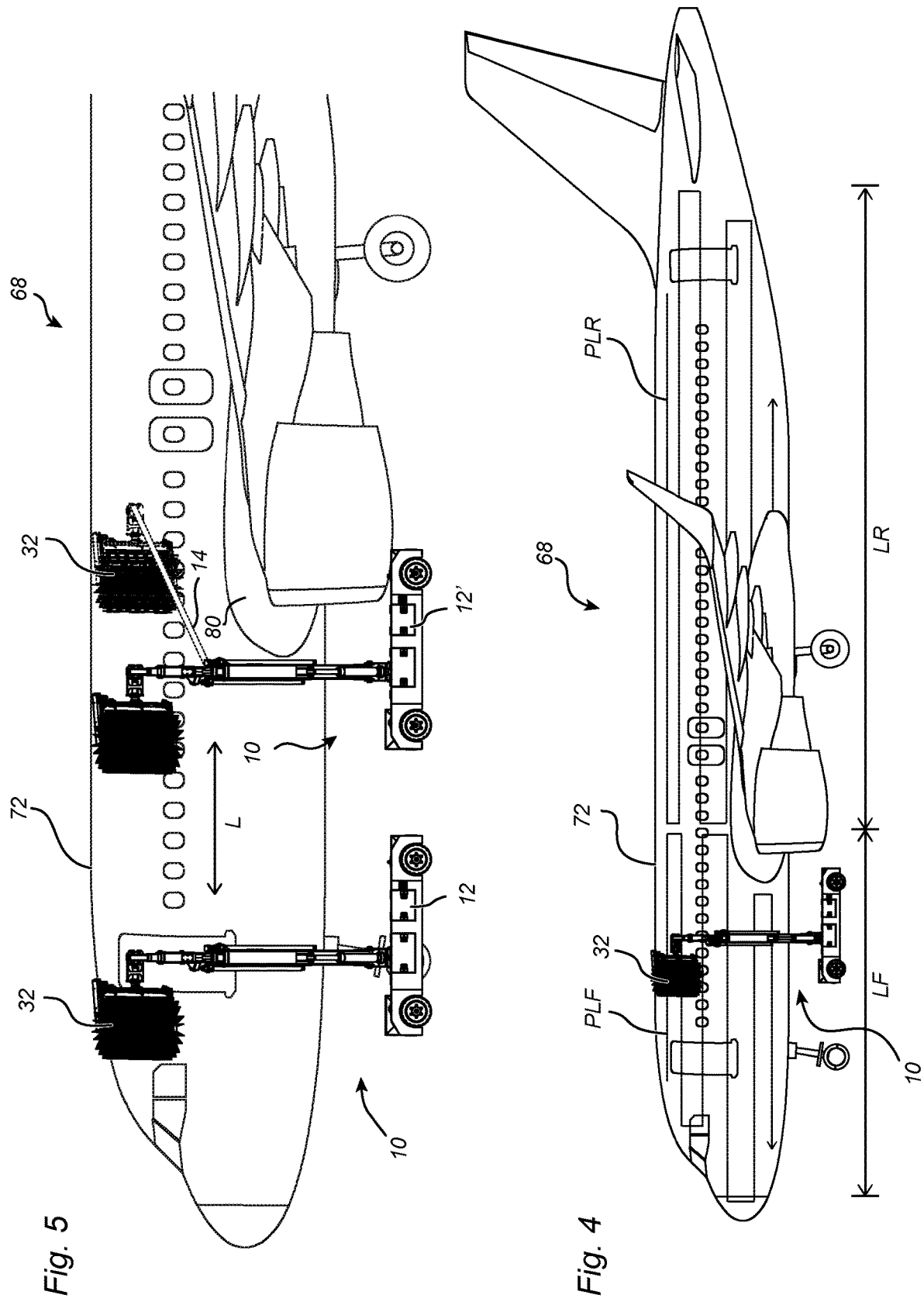

AIRCRAFT CLEANING ROBOT

FIELD OF THE INVENTION

The present invention relates to an aircraft cleaning robot.

BACKGROUND OF THE INVENTION

An aircraft having a dirty or unsmooth surface consumes substantially more fuel than a clean, polished aircraft. Hence, it is important that aircraft be maintained in a clean and polished condition. Typically, aircraft are cleaned and polished using a cleaning machine provided with an operator-controlled crane arm capable of reaching all parts of a large aircraft to be cleaned, and a cleaning head attached at a distal end of the arm for cleaning and polishing the aircraft. U.S. Pat. No. 5,833,762 suggests how an operator may park an aircraft cleaning robot in relation to reference marks in a parking field, and different predetermined motion programs of the robot arm, defined by consecutive sets of robot arm joint positions, may be selected based on the robot's position relative to the reference marks. The robot arm is calibrated by associating sets of robot arm joint positions with points in space which are obtained using a 3D laser scanner.

Calibration and positioning is time-consuming, and it is difficult to move a robot arm with simultaneously high accuracy and high speed in a situation where a collision may cause substantial damage. Moreover, each hour's stand-still of an aircraft represents a substantial loss of revenue. Hence, there is a need for a faster and safer way of cleaning an aircraft.

SUMMARY OF THE INVENTION

It is an object of the present invention to solve, or at least mitigate, parts or all of the above-mentioned problems. To this end, there is provided an aircraft cleaning robot comprising a mobile carrier provided with a set of front wheels and a set of rear wheels; a robot arm having a proximal end attached to the mobile carrier, and a distal end provided with a cleaning head; and a controller configured to control the position of the cleaning head relative to the mobile carrier by operating the robot arm, and to drive the mobile carrier along an aircraft to be cleaned, wherein each of the set of front wheels and the set of rear wheels are steerable, and the controller is configured to control the steering angle of the front and rear wheel sets. Thanks to having both front and rear wheels steerable, the position and heading of the mobile carrier relative to the aircraft to be cleaned can easily be adjusted without substantial translation of the mobile carrier along the aircraft. This may reduce the time required for setting up the aircraft cleaning robot in a cleaning start position, as well as the total cleaning time.

The wheels within each set of wheels may be individually steerable relative to each other. Alternatively, the wheels within each set of wheels may be coupled to each other to be steered to substantially the same steering angle.

According to an embodiment, the controller may be configured to steer each of the front and rear wheel sets in the same direction. This facilitates moving the mobile carrier sideways. Alternatively or additionally, the controller may be configured to steer each of the front and rear wheel sets in opposite directions, which reduces the turning radius of the mobile carrier and thereby allows more precise control of the aircraft cleaning robot.

According to an embodiment, the controller may be configured to steer each of the front and rear wheel sets in the same direction to substantially the same steering angle, thereby enabling crab steering of the mobile carrier.

The controller may be configured to control the steering angle of each of the front and rear wheel sets while cleaning the aircraft. According to an embodiment, the controller may be configured to detect a change in a horizontal distance between the mobile carrier and the surface to be cleaned; and based on said detected change, crab steer the mobile carrier to maintain a heading of the mobile carrier. This reduces the time required for setting up the aircraft cleaning robot in a cleaning start position, since the accuracy of positioning the aircraft cleaning robot relative to the aircraft to be cleaned can be reduced. The controller may, by way of example, crab steer the mobile carrier to maintain the horizontal distance at a target distance, or within a target distance interval.

There is also provided an aircraft cleaning robot comprising a mobile carrier; a robot arm having a proximal end attached to the mobile carrier, and a distal end provided with a cleaning head; and a controller configured to control the position of the cleaning head relative to the mobile carrier by operating the robot arm, and to drive the mobile carrier along an aircraft to be cleaned, while cleaning the aircraft, wherein the controller is configured to receive a distance signal indicating a change of distance between the mobile carrier and the aircraft; and based on the received distance signal, steer the mobile carrier to maintain a constant distance between the mobile carrier and the aircraft. Thereby, a faster cleaning of the aircraft may be obtained.

According to an embodiment, the cleaning head and the mobile carrier may be interconnected via a set of robot arm segments and a set of joints, wherein the distance signal is based on the position of at least one joint of said set of joints.

There is also provided an aircraft cleaning robot comprising a self-propelled mobile carrier; a robot arm having a proximal end attached to the mobile carrier and a distal end provided with a cleaning head, the robot arm being movable between a collapsed transport position and an extended working position; and a controller configured to control the position of the cleaning head relative to the mobile carrier by operating the robot arm, and to drive the mobile carrier along an aircraft to be cleaned, while cleaning the aircraft, wherein the controller is configured to receive a position signal indicating whether the robot arm is in the transport position or the working position and, based on the position signal, set a driving limitation of the mobile carrier. Thereby, the time required for cleaning an aircraft may be reduced, while maintaining a high level of safety. In particular, the time for moving the aircraft cleaning robot between different aircraft segments to be cleaned may be substantially reduced, without thereby allowing the aircraft cleaning robot to perform dangerous operations. The position signal may be read from one or several sensors detecting the position of one or several robot arm segments. Alternatively, the position signal may be generated by an operator, who may manually confirm e.g. that the robot arm is in transport position.

According to an embodiment, setting a driving limitation may comprise setting a transport position limit speed, when in transport position, which is higher than a working position limit speed, when in working position. When driving the mobile carrier with the robot arm in working position, the controller may be configured to prevent exceeding the working position limit speed. Alternatively, the controller may be configured to issue a warning to the operator if the working position limit speed is exceeded, without preventing exceeding it.

According to an embodiment, setting a driving limitation may comprise setting a maximum steering angle of a set of wheels, wherein said maximum steering angle is larger in transport position than in working position.

There is also provided an aircraft cleaning robot comprising a self-propelled mobile carrier provided with a first set of wheels and a second set of wheels; a robot arm having a proximal end attached to the mobile carrier and a distal end provided with a cleaning head; and a controller configured to control the position of the cleaning head relative to the mobile carrier by operating the robot arm, and to drive the mobile carrier along an aircraft to be cleaned, wherein the controller is configured to receive a speed signal indicating the speed of the mobile carrier; receive a wheel steering input signal from a user interface; and generate, based on the received speed signal and the received steering signal, a wheel steering control signal to steer at least one of said sets of wheels. Generating the wheel steering control signal based on the speed signal allows adapting the transfer function between the wheel steering input signal and the wheel steering control signal to the present speed, which allows enables easier and more precise control of the mobile carrier at all speeds. This allows reducing the cleaning time while maintaining a high level of safety. In particular, a higher transport speed of the mobile carrier may be obtained without losing precision when driving slowly.

There is also provided an aircraft cleaning robot comprising a self-propelled mobile carrier provided with a first set of wheels and a second set of wheels; a robot arm having a proximal end attached to the mobile carrier and a distal end provided with a cleaning head; and a controller configured to control the position of the cleaning head relative to the mobile carrier by operating the robot arm, and to drive the mobile carrier along an aircraft to be cleaned, wherein the controller is configured to determine a driving direction, and based on the driving direction, determine which set of wheels presently acts as front wheels and which set of wheels presently acts as rear wheels, respectively; generate a front wheel steering signal to the set of front wheels; and generate a rear wheel steering signal to the set of rear wheels, wherein the front and rear wheel steering signals are different, i.e. represent different steering angles. Thereby, a symmetrical driving behaviour in both forward and backward driving directions may be obtained, even though different behaviours of the front and rear wheels may be desired.

Generating a wheel steering control signal may comprise: at a lower speed, associating the wheel steering input signal with a relatively larger steering angle, and at a higher speed, associating the steering input signal with a relatively smaller steering angle. This facilitates control of the mobile carrier at all speeds. A conversion ratio from wheel steering input signal to rear wheel steering angle may be reduced, with increasing speed, more than a conversion ratio from wheel steering input signal to front wheel steering angle is reduced with the same increasing speed. Thereby, at relatively higher speeds, steering is to a relatively larger extent handled by the front wheels, which increases the manoeuvrability of the mobile carrier.

There is also provided an aircraft cleaning robot comprising a mobile carrier; a robot arm having a proximal end attached to the mobile carrier, and a distal end provided with a cleaning head, wherein the robot arm has at least a first arm segment, which is connected to the mobile carrier via a first pivotal joint, and a second arm segment, which is connected to the first arm segment via a second pivotal joint; and a controller configured to control the position of the cleaning head by operating the robot arm, wherein the controller is configured to receive control input, the control input indicating a desired movement direction of the cleaning head; determine, based on said control input and a transfer function, a respective joint movement direction and movement magnitude of each of a set of joints comprising said first and second pivotal joints to generate a movement of the cleaning head in said desired movement direction; and, based on the calculated movement direction and movement magnitude, simultaneously operate each joint of said set of joints to move the cleaning head in said desired movement direction. Direct operation of several joints at the same time requires substantial skill, and consecutively operating the respective joints results in a slow and iterative motion of the cleaning head. Thanks to the conversion of control input via a transfer function, e.g. an operator can move the cleaning head without regard to how operation of each respective joint moves the cleaning head. Moreover, several joints can be simultaneously operated based on a single operator input. The transfer function may convert a control input indicating a single, desired direction for the cleaning head to a plurality of control signals, for simultaneous control of a plurality of joints, to move the cleaning head in said desired direction. The transfer function may receive, as input, the respective present positions of each joint of said set of joints, and generate said movement directions and magnitudes based on said present positions. The controller may be arranged in e.g. the mobile carrier. Alternatively, it may be arranged in a separate control unit, in communication with the mobile carrier and robot arm.

According to an embodiment, the determination of the respective joint movement direction and movement magnitude of the joints may comprise determining the present coordinates of the cleaning head based on the transfer function and the present positions of the set of joints; determining target coordinates based on the control input; determining a target position of each joint of the set of joints based on the transfer function and the target coordinates; and determining the respective joint movement direction and movement magnitude based on the present and target positions of the respective joint.

According to an embodiment, said transfer function may be configured to generate said movement of the cleaning head along a substantially straight line. Thanks to the transfer function conversion to simultaneously operate multiple joints, a single operator input may move the cleaning head in straight lines, instead of along polar coordinates defined by each respective joint axis.

According to an embodiment, said transfer function may be configured to generate said movement of the cleaning head along an axis of a coordinate system aligned with an airplane to be cleaned. Thereby, the operator can easily move the cleaning head along the surface of the aircraft, without having to consider how the cleaning robot is oriented in relation to the aircraft. By way of example, the coordinate system may be cartesian; alternatively, it may be cylindrical with the longitudinal coordinate axis aligned with the longitudinal axis of the aircraft.

According to an embodiment, the controller may be configured to receive said control input from an operator via a user interface. The user interface may comprise a joystick, a pair of orthogonal axes of which correspond to a pair of axes of the coordinate system aligned with the aircraft to be cleaned.

According to an embodiment, the controller may be configured to, based on an instruction to change the cleaning head's direction of motion, gradually increase a control value determining the pivot speed of a first joint of said set of joints, while gradually decreasing a control value determining the pivot speed of a second joint of said set of joints. Such operation reduces swaying of the robot arm without increasing the cleaning time, since the simultaneous motion along several degrees of freedom allows soft starting and stopping of each joint without reducing the speed of the overall motion of the cleaning head.

There is also provided an aircraft cleaning robot comprising a mobile carrier; a robot arm having a proximal end attached to the mobile carrier, and a distal end provided with a cleaning head, wherein the robot arm has at least a first arm segment, which is connected to the mobile carrier via a first pivotal joint, and a second arm segment, which is connected to the first arm segment via a second pivotal joint; and a controller configured to control the position of the cleaning head by operating the robot arm, wherein the controller is configured to, when the robot arm is in a collapsed position such as a transport position, receive an initiation signal from an operator indicating that the cleaning head is to be moved to a cleaning start position; and simultaneously operate each of a set of joints comprising the first and second joints to move the cleaning head along a predetermined path to a cleaning start position adjacent to the surface of the aircraft. Once having reached the cleaning start position, the controller may stop the motion of the cleaning head. Thereby, the robot arm may be automatically unfolded to move the cleaning head along the predetermined path to assume the starting position. This shortens the time required for preparing the cleaning robot for cleaning, which is typically repeated for each aircraft segment to be cleaned. Manually unfolding the robot arm is typically very time consuming, and it's very difficult to control each respective joint to move the cleaning head along the shortest/most efficient line to the cleaning start position. Joint motions for obtaining the predetermined path may be determined on beforehand using a transfer function as lined out hereinabove, and read from a computer memory when needed. Alternatively, the respective joint motions may be calculated when needed. Once having reached the cleaning start position, there may be a gap between the cleaning head and the surface to be cleaned. Alternatively, the cleaning robot may be configured to continue along said predetermined path until presence sensors of the cleaning head detect that the cleaning head has engaged the surface to be cleaned, and stop motion upon detection of such engagement. The controller may also be configured to move each pivotal joint along a respective predetermined path in space, to avoid that the robot arm hits any portion of the aircraft.

According to an embodiment, the controller may be configured to select the predetermined path based on aircraft type and/or aircraft segment. For the purpose, the controller may be configured to receive operator input identifying the aircraft type and/or the aircraft segment to be cleaned. Alternatively or additionally, the controller may be configured to select the predetermined path based on the mobile carrier's position in relation to the aircraft. Thereby, the cleaning head can take the fastest route to the cleaning start position with due regard to e.g. the location of wings and antennas. The controller may be configured to move the cleaning head along the shortest path at aircraft segments or mobile carrier positions free from obstacles. At other aircraft segments/mobile carrier positions, it may be configured to move the cleaning head and/or robot arm joints along a respective constrained detour around e.g. a wing to bring it to the start position. By way of example, the controller may be configured to allow the operator to enter information identifying a segment of the aircraft, and select the predetermined path based on the assumption that the mobile carrier is positioned in a predetermined position relative to said aircraft segment. Alternatively, the aircraft cleaning robot may be provided with sensors configured to detect the mobile carrier's position in relation to the aircraft, and the predetermined path may be calculated based on a three-dimensional model of the aircraft.

According to an embodiment, the controller may be configured to interrupt said predetermined motion in the event that a dead man's switch is disengaged. By way of example, the dead man's switch can be configured as a button that needs to be depressed by an operator in order to keep the cleaning head in motion. The controller may be configured to re-assume motion as soon as the dead man's switch is re-engaged.

According to an embodiment, said set of joints for simultaneous control may further comprise a swivel joint between the first pivotal joint and the mobile carrier. The swivel joint may be configured to swivel the robot arm about a vertical axis.

According to an embodiment, at least one of said first and second robot arm segments may be telescopic, defined by at least two respective telescopic subsegments which are interconnected by a telescopic, i.e. prismatic, joint. Thereby, the robot can assume a compact configuration, minimizing the free volume required for operating, while still allowing cleaning large aircraft. According to an embodiment, said set of joints for simultaneous control may comprise said telescopic joint.

There is also provided an aircraft cleaning robot comprising a self-propelled mobile carrier; a robot arm having a proximal end attached to the mobile carrier, and a distal end provided with a cleaning head, wherein the robot arm has at least a first arm segment, which is connected to the mobile carrier via a first pivotal joint, and a second arm segment, which is connected to the first arm segment via a second pivotal joint; and a controller configured to control the position of the cleaning head relative to the mobile carrier by operating the robot arm, and to drive the mobile carrier, wherein the controller is configured to move the cleaning head in a substantially horizontal direction along the aircraft, while cleaning the aircraft; and determine whether to move the cleaning head in the horizontal direction by operating the robot arm, by driving the mobile carrier along the aircraft, or both. Thereby, the cleaning robot can maximize the cleaning speed while moving along sections of the aircraft body free from obstacles, by driving the mobile carrier, while still being able to reach e.g. positions above wings by operating the robot arm. The substantially horizontal direction may be substantially parallel to the longitudinal axis of the aircraft body.

According to an embodiment, said determination may be made based on a predetermined cleaning route of the cleaning head. The determination may be based on driving instructions stored in a computer memory, for following a predetermined path associated with e.g. an aircraft or aircraft segment. Thereby, it may be assured that all relevant parts of the aircraft are cleaned, and that no parts are cleaned more than necessary.

According to an embodiment, the controller may be configured to receive operator input identifying the aircraft type and/or an aircraft segment identity; and make said determination based on said operator input. Alternatively, the aircraft type and segment may be automatically identified by the cleaning robot. Such automatic identification may be obtained e.g. by the aircraft cleaning robot comprising an RFID reader, and different aircraft and/or aircraft segments being provided with unique RFID tags readable by the RFID reader.

According to an embodiment, the controller may be configured to move the cleaning head based on continuous input from the operator. By way of example, the controller may be configured to maintain the motion as long as a dead man's switch is engaged. Alternatively, the controller may be configured to generate, based on said determination, driving instructions to an operator, and to receive control commands from the operator. Still alternatively, the controller may be configured to autonomously move the cleaning head along a predetermined path without operator input.

There is also provided an aircraft cleaning robot comprising a mobile carrier; a robot arm having a proximal end attached to the mobile carrier and a distal end provided with a cleaning head, wherein the robot arm comprises a first joint and a second joint; and a controller configured to control the position of the cleaning head relative to the mobile carrier by operating the robot arm, and to drive the mobile carrier along an aircraft to be cleaned, while cleaning the aircraft, wherein the controller is configured to detect a change of distance between the mobile carrier and the aircraft, and based on said detected change of distance, operate one of said first and second joints to maintain a desired cleaning engagement pressure between the cleaning head and the aircraft; and operate the other of said first and second joints to maintain an elevation of the cleaning head. Such a cleaning robot increases the speed at which an aircraft can be cleaned, since the cleaning head may follow parallel, horizontal strokes with a minimum of overlap. If the distance between the mobile carrier and the surface to be cleaned changes, the cleaning robot will need to adjust the robot arm to maintain the correct cleaning engagement pressure against the surface to be cleaned. The ability to automatically operate several robot arm joints, and not only e.g. the most distal robot arm joint, in response to a distance change, allows maintaining the constant elevation.

According to an embodiment, said first joint may be a pivot joint, and said second joint may be a pivot joint, a swivel joint, or a telescopic joint.

There is also provided an aircraft cleaning robot comprising a robot arm having a proximal end attached to a mobile carrier, and a distal end provided with a cleaning head comprising a brush for brushing an aircraft to be cleaned, wherein the brush is rotatably attached to the robot arm to be rotated about a brush rotation axis; and a controller configured to control the position and orientation of the cleaning head, wherein the cleaning head is provided with a brush engagement angle detector configured to detect a brush engagement angle between a brushing face of the brush and the surface being brushed; and the controller is configured to control the orientation of the cleaning head based on the detected brush engagement angle. By controlling the cleaning head based on feedback from the brush engagement angle detector, a faster cleaning of the aircraft may be obtained, since the brush may always be set in proper alignment with the surface to be cleaned, regardless of the position of the robot arm. The controller may control the cleaning head to maintain the detected brush engagement angle below a limit value. An exemplary limit value may be between 2° and 15°. Alternatively, the controller may operate a feedback loop aiming for a setpoint value for the brush engagement angle of e.g. 0°.

According to an embodiment, the brushing face may face in a radial direction of the brush rotation axis. The brush may be circular cylindrical about the brush rotation axis.

According to an embodiment, the sensor arrangement may comprise at least two distance sensors which are axially separated with respect to the brush rotation axis. By way of example, the sensors may be configured as a plurality of probes, which are configured to engage with the surface to be cleaned.

There is also provided an aircraft cleaning robot comprising a robot arm having a proximal end attached to a mobile carrier, and a distal end provided with a cleaning head comprising a brush for brushing an aircraft to be cleaned, wherein the brush is rotatably attached to the robot arm to be rotated about a brush rotation axis; and a controller configured to control the position of the cleaning head, wherein the aircraft cleaning robot is configured to automatically orient the brush such that a cleaning face of the cleaning head is aligned with the surface being brushed; and the controller is configured to, based on input from the robot arm and/or cleaning head, determine a cleaning direction in which the cleaning face is presently facing; and, based on the determined direction, operate the robot arm to apply a brush engagement pressure in the determined cleaning direction. Thereby, a faster and more accurate cleaning of the aircraft may be obtained. A brush engagement pressure may be represented e.g. by the force applied by the robot arm in the cleaning direction, by the distance between the brush's rotation axis and the surface being cleaned, or by the power required to rotate the brush. According to an embodiment, the controller may be configured to operate the robot arm to apply a predetermined brush engagement pressure in the determined cleaning direction. The predetermined brush engagement pressure may, for example, correspond to a setpoint value of a control loop. The controller may be configured to operate the robot arm in the determined cleaning direction. The automatic orienting of the brush may be passive, using e.g. a passive brush swivel joint or pivot joint which, when the brush engages with the aircraft, flexibly assumes the correct position such that the cleaning face of the cleaning head is aligned with the surface being brushed. Alternatively, the automatic orienting of the brush may be active, i.e. the controller may be configured to actively control also the orientation of the cleaning head, for example by actively controlling a brush swivel joint. The input from the robot arm and/or cleaning head, upon which the cleaning direction is determined, may comprise information representing the geometry of robot arm joints and segments, allowing the position of the cleaning head relative to the aircraft to be determined. The brush engagement pressure may be controlled based on a feedback loop, wherein the motion of the robot arm is controlled based a detected brush engagement pressure. The brush engagement pressure may, by way of example, be detected using e.g. the brush engagement angle detector described hereinabove; by detecting a torque in one or several joints of the robot arm; or by determining the rotation resistance of the brush, e.g. by measuring the electrical current consumed by a brush rotation motor for a certain rotation speed. The controller may be configured to determine the cleaning direction based on the position of each of a plurality of joints of the robot arm. Said input from the robot arm and/or cleaning head may be received from the robot arm as such, or from the controller based on a representation of e.g. the present position of the robot arm in the controller. Operation of the robot arm in the determined cleaning direction may be based on e.g. a transfer function as defined herein, which transfer function converts the cleaning direction to a plurality of control signals for simultaneous control of a plurality of joints.

According to an embodiment, the controller may be configured to generate cleaning data for storage, the cleaning data comprising a brush engagement pressure and/or a brush engagement time for each of a plurality of positions of the cleaning head. Each of said positions of the cleaning head may be associated with a respective portion of the surface to be cleaned. The aircraft cleaning robot thereby allows verifying, after cleaning, to what extent each portion of the surface to be cleaned has indeed been cleaned, and any portions that may have received too little treatment may easily be identified for e.g. manual cleaning. Said plurality of positions of the cleaning head may comprise all positions in which an engagement between the brush and the aircraft is detected. The cleaning data may be stored in a memory located in the aircraft cleaning robot. Alternatively, the controller may be configured to transmit cleaning data to a remote memory.

There is also provided an aircraft cleaning robot comprising a self-propelled mobile carrier; a robot arm having a proximal end attached to the mobile carrier and a distal end provided with a cleaning head; a first controller configured to control the position of the cleaning head relative to the mobile carrier by operating the robot arm, and to drive the mobile carrier along an aircraft to be cleaned, wherein the controller operates based on data from a first set of sensors; and a second controller configured to monitor the robot arm and the cleaning head based on data from a second set of sensors which is at least partly different from the first set of sensors, the second controller being configured to monitor a measured combination of sensor data from the second set of sensors, determine if the measured combination corresponds to a combination of data implying a risk, and, if so, disable or reverse control actions of the first controller. Such an aircraft cleaning robot is robust and safe, while still cost efficient.

According to an embodiment, the second controller may be configured to classify whether a combination of data from the second set of sensors is a safe combination or an unsafe combination, and interfere with the first controller only in case of an unsafe combination. Such an arrangement may allow for having one precise, relatively high-resolution, set of sensors for controlling the robot with high accuracy, and one set of fail-safe sensors for detecting dangerous conditions. The high-resolution set of sensors need not be fail-safe, and the fail-safe set of sensors need not provide as high resolution as the set of relatively high-resolution sensors. This reduces the total cost of the robot.

According to an embodiment, said combination of data from the second set of sensors may be classified based on a lookup table. Thereby, a very fast detection of dangerous conditions can be obtained. The lookup table may be pre-defined, and may be determined based on the kinematic chain of the robot arm and/or the geometry of the aircraft to be cleaned.

According to an embodiment, the second controller may be configured to operate based on a torque sensor measuring a torque at the proximal end of the robot arm. The torque may, for example, be measured in a joint of the robot arm.

There is also provided an aircraft cleaning robot comprising a self-propelled mobile carrier adapted to move over a base plate on which an aircraft to be cleaned is located; a robot arm having a proximal end attached to the mobile carrier and a distal end provided with a cleaning head; and a controller configured to control the position of the cleaning head relative to the mobile carrier by operating the robot arm, and to drive the mobile carrier along the aircraft to be cleaned, while cleaning the aircraft, the controller being configured to receive first data corresponding to a coordinate system of the base plate, receive second data corresponding to a geometry of the aircraft type of the aircraft to be cleaned, receive third data corresponding to the positioning of the aircraft to be cleaned in relation to the coordinate system of the base plate, and to move the carrier and the robot arm based on a combination of the first, second and third data.

According to an embodiment, said third data may be based on the location of a reference object attached to the aircraft.

According to an embodiment, the reference object may be a radio transmitter.

According to an embodiment, the aircraft cleaning robot may be configured to operate based on a real-time kinematics, RTK, sensor located at the cleaning head of the robot arm, and a base station receiver/transmitter being attached to the aircraft.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 4 is a schematic side view of the aircraft cleaning robot and aircraft of FIG. 3, along with an illustration of an exemplary trajectory of the cleaning head;

FIG. 5 is a schematic side view of the aircraft cleaning robot and aircraft of FIG. 4, wherein the aircraft cleaning robot is illustrated in three consecutive positions;

DETAILED DESCRIPTION OF THE EXEMPLARY EMBODIMENTS

Figure 1:
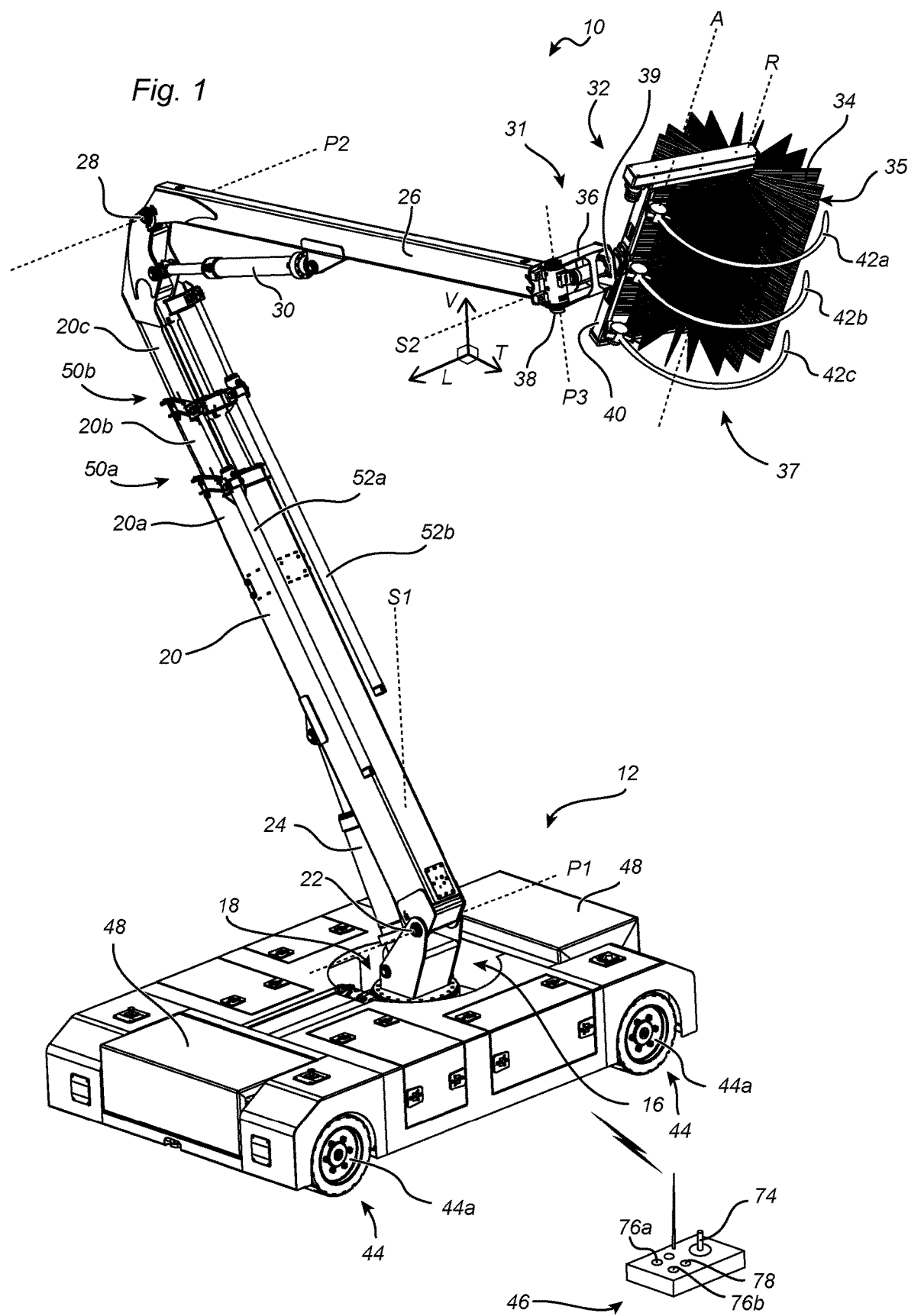
FIG. 1 is a diagrammatic view in perspective of an aircraft cleaning robot.

FIG. 1 illustrates a self-propelled aircraft cleaning robot 10 comprising a mobile carrier 12, and a robot arm 14. At its proximal end 16, the robot arm 14 is attached to the mobile carrier 12 via an arm swivel joint 18, which is configured to swivel the robot arm about a vertical arm swivel axis S1. The robot arm 14 comprises a first arm segment 20, which is connected to the arm swivel joint 18 via a first pivotal joint 22, allowing the first arm segment 20 to pivot relative to the mobile carrier 12 about a substantially horizontal first pivot axis P1. A first hydraulic cylinder 24 is configured to operate the first pivot joint 22. A second arm segment 26 is connected to the first arm segment 22 via a second pivot joint 28, which allows pivoting the second arm segment 26 relative to the first arm segment 20 about a substantially horizontal second pivot axis P2. A second hydraulic cylinder 30 is configured to operate the second pivot joint 28. At its distal end 31, the robot arm 14 carries a cleaning head 32 provided with a rotatable brush 34 for brushing the surface of the aircraft to be cleaned. A motor (not visible in the view of FIG. 1) allows rotating the brush 34 about brush rotation axis R, such that the motion of the brush 34 defines a substantially circular cylindrical brushing face 35 for brushing an aircraft to be cleaned. A cleaning face 37 of the cleaning head 32 is configured to face the surface to be cleaned during brushing of the same. An end segment 36 of the robot arm 14 is connected to the second arm segment 26 via a third pivot joint 38. The third pivot joint 38 allows pivoting the end segment 36 relative to the second arm segment 26 about a third pivot axis P3, which is substantially perpendicular to the second pivot axis P2. A brush swivel joint 39 connects the cleaning head 32 to the end segment 36, and allows swivelling the brush 34 about a brush swivel axis S2, which is substantially perpendicular to the brush rotation axis R, for controlling the engagement angle between the brush rotation axis R and the surface to be cleaned. The brush swivel axis S2 is also substantially perpendicular to the third pivot axis P3.

The cleaning head 32 comprises a yoke 40, which straddles and holds the axial ends of the brush 34. Three curved engagement probes 42a, 42b, 42c extend from the yoke 40, and are pivotally attached thereto to allow pivoting individually about a probe axis A substantially parallel to the brush rotation axis R. The probes 42a-c are resiliently suspended to allow swinging about the probe axis A into the brush 34, towards the brush rotation axis R, and they are biased away from the brush 34 towards an unbiased rest position, illustrated in FIG. 1, adjacent to the brushing face 35. The resilient suspension allows the probes 42a-b to be pressed into the brush 34 by the aircraft surface cleaned by the brush 34. Each probe 42a-c is operably connected to a respective probe angle detector (not illustrated), which is configured to generate an angle signal indicating how deep the respective probe 34a-b has been pushed into the brush 34. This provides an indication of the radial distance between the aircraft surface and the brush rotation axis R at three axially separate positions.

The mobile carrier 12 is provided with four wheels 44, two of which are visible in the perspective view of FIG. 1. The wheels 44 are arranged as a pair of front wheels 44a and a pair of rear wheels 44b. At least one pair of wheels 44 are drive wheels, which are configured to be rotated by a drive motor (not visible). The mobile carrier 12 also carries electronics and hydraulics for operating the aircraft cleaning robot 10 based on wirelessly received input from a remote-control panel 46 separate from the mobile carrier 12. Two battery modules 48 are configured to provide power to the electronics and hydraulics, and are located at respective ends of the mobile carrier in order to optimize the weight distribution and balance of the mobile carrier 12. Alternatively, one of the battery modules 48 may be replaced with a compartment comprising containers for water and cleaning chemicals (not illustrated), which e.g. may be conveyed to and dispensed from nozzles at the cleaning head 32 in a non-illustrated manner.

The first arm segment 20 comprises a first subsegment 20a; a second subsegment 20b, which is connected to the first subsegment 20a via a first telescopic joint 50a; and a third subsegment 20c, which is connected to the second subsegment 20b via a second telescopic joint 50b. Thereby, the first arm 20 may telescope in its longitudinal direction to almost thrice the length illustrated in FIG. 1. Each telescopic joint 50a, 50b is operated by means of a respective hydraulic cylinder 52a-b.

Figure 2:
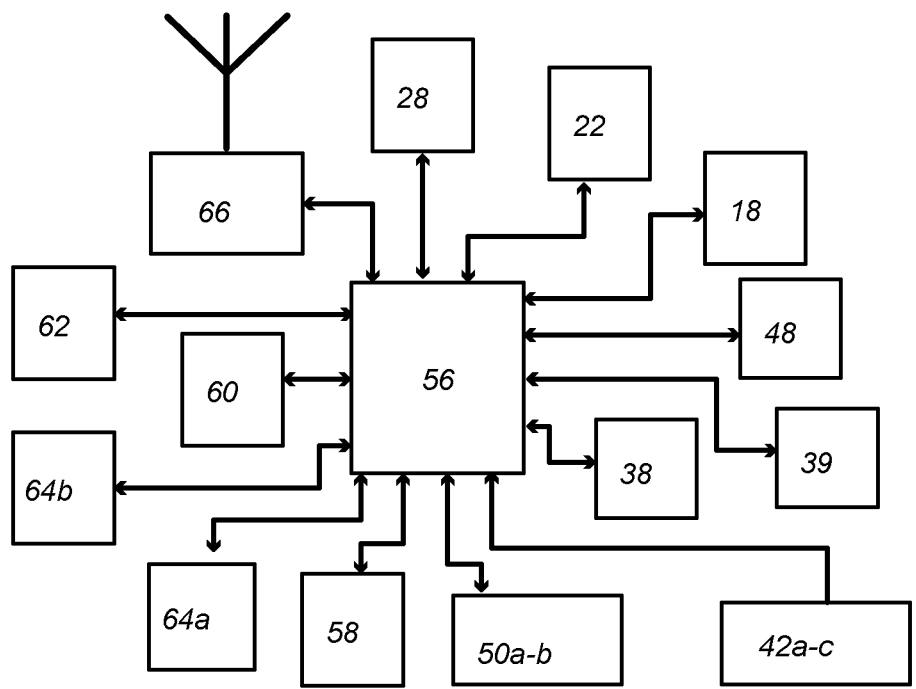
FIG. 2 is a schematic illustration of an exemplary control system of the aircraft cleaning robot of FIG. 1.

FIG. 2 schematically illustrates a control system 54 for controlling the cleaning robot 10. The control system 54 comprises a controller 56 configured to, based on computer instructions stored in a memory 58, control the various actuators of the cleaning robot 10. The position of each of the joints 18, 22, 28, 38, 39, 50a, 50b is controllable by operating the respective actuator, such as the hydraulic cylinders 24, 30, 52a, 52b (FIG. 1), and each joint is also provided with a position sensor (not illustrated) configured to generate a position signal to the controller 56, as is illustrated by the double arrows in FIG. 2. For the revolute pivot and swivel joints 22, 28, 38, 18, 39, the position signal indicates an angular position of the respective joint, whereas for the telescopic joints 50a, 50b, the position signal indicates a degree of longitudinal extension of the respective joint 50a, 50b. The controller 56 also controls the operation of the brush rotation motor 60; of a drive motor 62 for driving at least one wheel 44 of the mobile platform; and of at least one respective steering motor 64a-b for each pair 44a-b of wheels 44a, 44b in a as will be described in greater detail further below. The controller 56 also receives signals indicating the respective pivot angles of the probes 42a-c. A communications module 66 allows the controller 56 to receive wireless commands from, and transmit operator notifications to, the remote-control panel 46 (FIG. 1).

Figure 3:
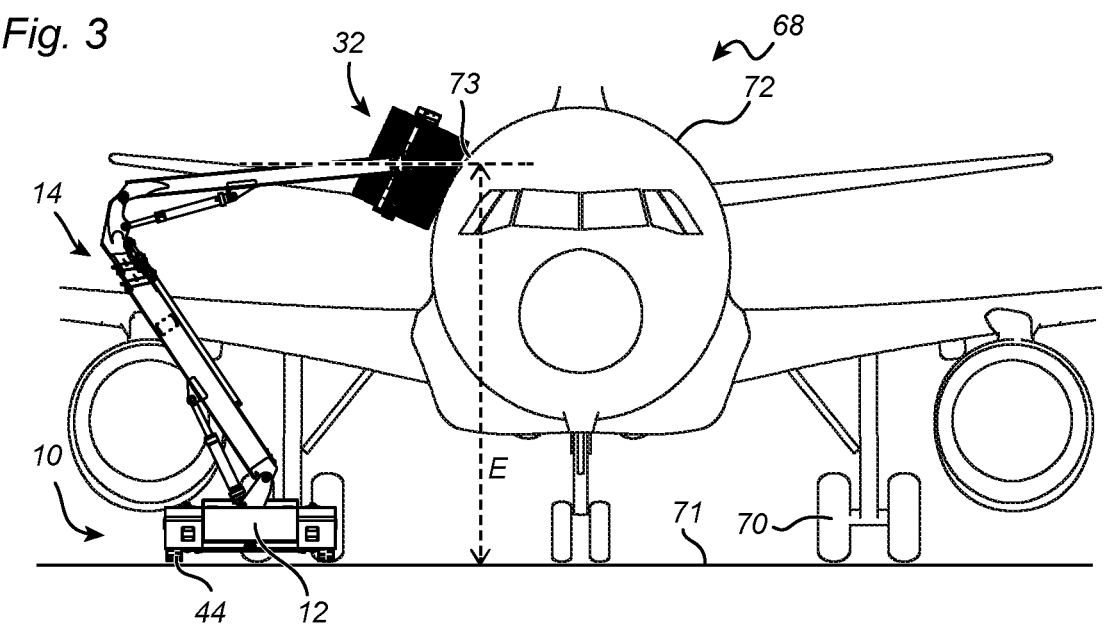
FIG. 3 is a schematic front view of the aircraft cleaning robot of FIG. 1 with a cleaning head set in a cleaning position adjacent to an aircraft.

FIG. 3 illustrates the aircraft cleaning robot 10 positioned alongside an aircraft 68 with its wheels 44 parallel to the wheels 70 of the aircraft 68, such that the mobile carrier 12 can drive in a direction substantially parallel to the longitudinal direction of the body 72 of the aircraft 10 while cleaning the body 72. In the view of FIG. 3, the robot arm 14 is illustrated unfolded to a cleaning position, in which the cleaning head 32 is positioned adjacent to the surface 73 to be cleaned. When cleaning the aircraft 68, the mobile carrier 12 drives along the aircraft 68 with the cleaning head 32 at a constant elevation E above the ground 71 to clean the aircraft 68 in horizontal strokes, and changes the elevation E of the cleaning head 32 between consecutive strokes. The end segment 36 (FIG. 1) is oriented with its longitudinal axis substantially parallel to the surface 73 to be cleaned, and is controlled by the controller 56 to pivot about the third pivot axis P3 towards the surface 73 to be cleaned to apply a substantially uniform brush engagement pressure against the surface 73.

Referring back to FIG. 1, the longitudinal direction of the aircraft body 72 (FIG. 3), i.e. the direction of horizontal travel of the mobile carrier 12, is indicated by an arrow L. The cleaning head 32 can be moved along a straight line in the longitudinal direction L by operating the robot arm 14. Such longitudinal movement may be triggered by an operator moving a joystick 74 of the remote-control panel 46 in a predetermined direction associated with the longitudinal direction L, and the panel 46 in response generating control input the controller 56 (FIG. 2) to move the cleaning head 32 in the longitudinal direction L. Movement along the longitudinal direction L can, by way of example, be obtained by simultaneously operating each of the first and second pivot joints 22, 28, and the arm swivel joint 18. Alternatively, other subsets of joints may also be simultaneously operated to obtain such movement, but in any event, movement in the longitudinal direction L by means of the robot arm 14 requires operating several joints. Moreover, for each position of the robot arm 14, a movement in the longitudinal direction L requires the different relative magnitudes or amplitudes of the motions in the joints involved. For the purpose, the controller 56 is configured to generate respective control signals to each of the respective joints 22, 28, S1 based on a predetermined transfer function which, for each position of the robot arm joints, associates the control input with a control signal weight of each respective joint.

Similarly, a second predetermined direction of the joystick 74, which may be perpendicular to said first predetermined direction of the joystick 74, may be associated with a vertical direction V, allowing the operator to generate control input to move the cleaning head 32 in a straight vertical line. The controller 56 may be configured to generate a motion in the vertical direction V in response to receiving such control input from the remote-control panel 46. A pair of buttons 76a-b may be associated with a motion of the cleaning head 32 along a horizontal direction T perpendicular to the longitudinal direction L, allowing the operator to easily move the cleaning head 32 in a straight line, based on a single input, along any axis L, V, T of a cartesian coordinate system. The controller 56 uses the input received from the joystick 74 and buttons 76a-b for generating, based on the transfer function, weighted control signals to move the cleaning head along any of the axes L, V, T, and when simultaneously receiving multiple control input signals from the both axes of the joystick 74 as well as the any of the buttons 76a-b, the controller 56 sums, for each joint, the weighted control signals generated based on the control signals for each axis L, V, T.

The multiple joints of the robot arm 14 alone provides more degrees of freedom than what is required for reaching each point in space reachable by the cleaning head 56. Therefore, each motion of the robot arm 14 may be obtained by simultaneously operating a first subset of the joints 18, 22, 28, 38, 39, 50a, 50b of the robot arm 14, or by a second subset of the joints of the robot arm 14, wherein the second subset is at least partly different from the first subset. Alternatively, the first and second subsets may be operated simultaneously for obtaining a faster movement of the robot arm 14. This also means that in an aircraft cleaning robot 10 having a sufficient number of joints/degrees of freedom to define an overdetermined system, the aircraft cleaning robot may be configured to automatically select, for each position of the cleaning head 32, the combination of joint positions resulting in the highest stability robot arm stability. Clearly, the mobility of the mobile carrier 12 adds even more degrees of freedom.

The transfer function is based on a model of the geometry of the robot arm, including all joints and arm segments. When generating a trajectory, the controller first determines, using the transfer function, the present position of the cleaning head 32 in the coordinate system L, V, T. Based on the control input, the controller 56 determines a target position of the cleaning head 32 to be reached in the coordinate system L, V, T. Then, the controller determines, based on inverse kinematics using the transfer function, a set of possible robot arm positions for the cleaning head target position, and selects a robot arm target position from the set of possible robot arm positions. For each position of the set of possible robot arm positions, the controller 56 determines the minimum travel time for each joint to reach its position corresponding to the respective robot arm position, and selects the possible robot arm position involving the shortest of the longest minimum travel time within the joint set to be operated, i.e. the possible robot arm position that can be reached within the shortest time if any combination of joints are allowed to be operated simultaneously, to be the target robot arm position. The selection is made with due regard to the additional constraint that no disallowed robot arm positions may be reached along the way. After having determined the target robot arm position, each joint to be operated is operated at a speed which will bring the joint to the respective joint position to be reached in substantially said longest minimum travel time of the set of joints to be operated. Thereby, all joints are operated as slowly as possible without increasing the time required to reach the target robot arm position. Such a way of controlling the robot arm 14 minimizes swaying.

When the controller 56 receives instructions from the remote-control panel 46 to change the cleaning head's 32 direction of motion, it will change from operating a first subset of joints to operating a second subset of joints wherein the two subsets may partly overlap. For those joints which are not part of both subsets, the controller 56 may gradually decrease the control values of the joints to be stopped, while gradually increasing the control values of those joints to be set in motion, still while maintaining the motion of the joints which are part of both subsets. Thereby, the overall motion of the robot arm 14 does not stop, which further reduces swaying.

FIG. 4 illustrates the operation of the aircraft cleaning robot 10 while cleaning an aircraft 68. The body 72 of the aircraft 68 is divided into a plurality of aircraft segments LF, LR, two of which are illustrated in FIG. 4, and each of which is cleaned in a respective single continuous cleaning operation. Each respective aircraft segment LF, LR is cleaned in accordance with a predefined motion pattern made up of horizontal strokes, which are interconnected by vertical strokes to define a rectangularly meandering pattern over the cylindrical surface of the aircraft body 72. Exemplary stroke patterns for the aircraft segments LF, LR are illustrated by respective broken arrows PLF, PLR. The operator may, via a graphical user interface (not illustrated) on the remote-control panel 46 (FIG. 1), select an aircraft type, such as "Airbus 320", from a plurality of available aircraft types, and an aircraft segment, such as left front aircraft segment LF or left rear aircraft segment LR. Based on the selection, the controller 56 retrieves a program associated with the aircraft type and aircraft segment from the memory 58. The program comprises instructions for operating the robot arm 14 (FIG. 1) as well as the mobile carrier 12 (FIG. 1). As illustrated in FIG. 4, each aircraft segment LF, LR may comprise e.g. portions of the aircraft body 72 above the wings 80.

FIG. 5 illustrates the operation of the aircraft cleaning robot 10 during an exemplary single horizontal stroke. Starting from the leftmost position illustrated, and based on the stored instructions, the controller 56 moves the cleaning head 32 along the longitudinal direction L by operating the drive motor 62 (FIG. 2) to drive the mobile carrier 12 in the longitudinal direction L wherever the path of the cleaning robot 10 is unblocked by obstacles. Once the mobile carrier 12 reaches the position 12' adjacent to the wing 80, it automatically, based on the instructions associated with the aircraft segment LF, stops the mobile carrier 12, and sets the robot arm 14 in motion to continue the cleaning head's 32 straight path in the longitudinal direction L. In order to minimize swaying of the robot arm 14, as the aircraft cleaning robot 10 approaches the wing 80, the controller 56 operates the robot arm 14 to gradually increase the speed of the cleaning head 32 relative to the mobile carrier 12 along the longitudinal direction L, while gradually decreasing the speed of the mobile carrier 12. Thereby, the motion of the cleaning head 32 does not need to stop. For safety reasons, the operation of the drive motor 62 and the joints of the robot arm 14 is maintained only on the condition that a deadman's switch 78 (FIG. 1) is kept in engagement by the operator. Other than that, the cleaning robot 10 follows the predetermined path PLF, PLR (FIG. 4) without requiring any additional operator input.

Figure 6A:
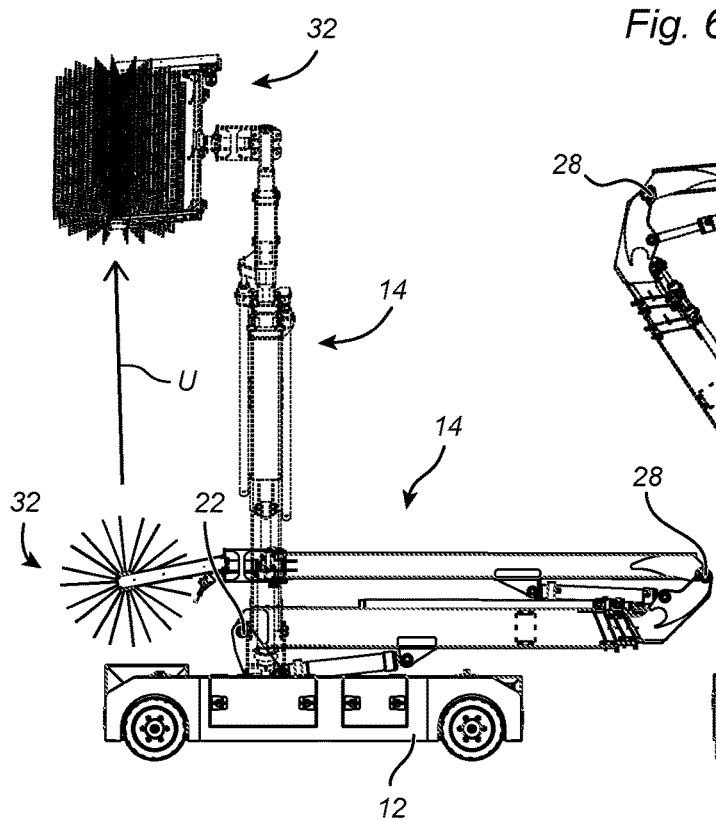
FIG. 6A is a diagrammatic side view of the aircraft cleaning robot of FIG. 1, illustrating a trajectory of a robot arm of the aircraft cleaning robot between a transport position and a cleaning start position.
Figure 6B:
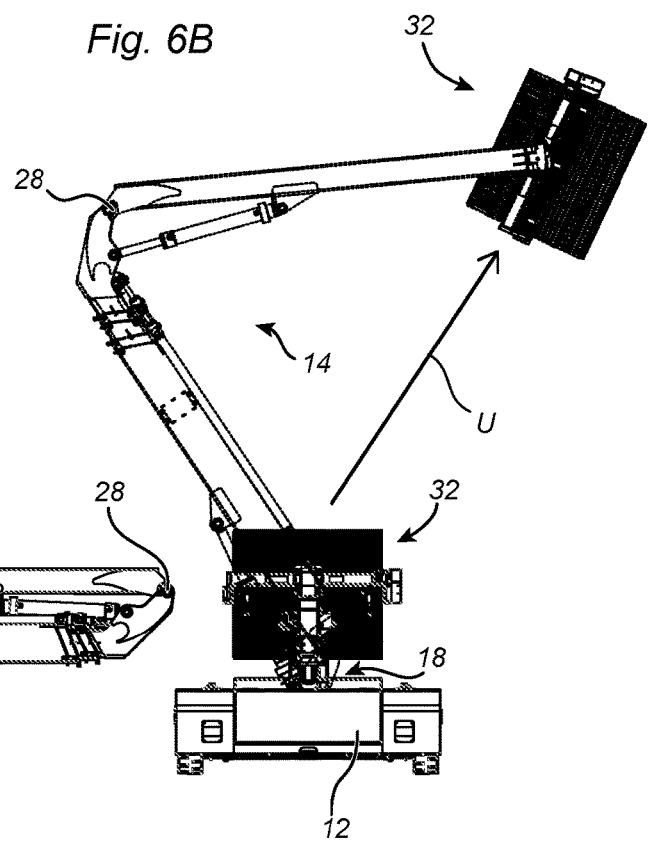
FIG. 6B is a diagrammatic front view of the aircraft cleaning robot, positions, and trajectory of FIG. 6A.
Figure 6C:
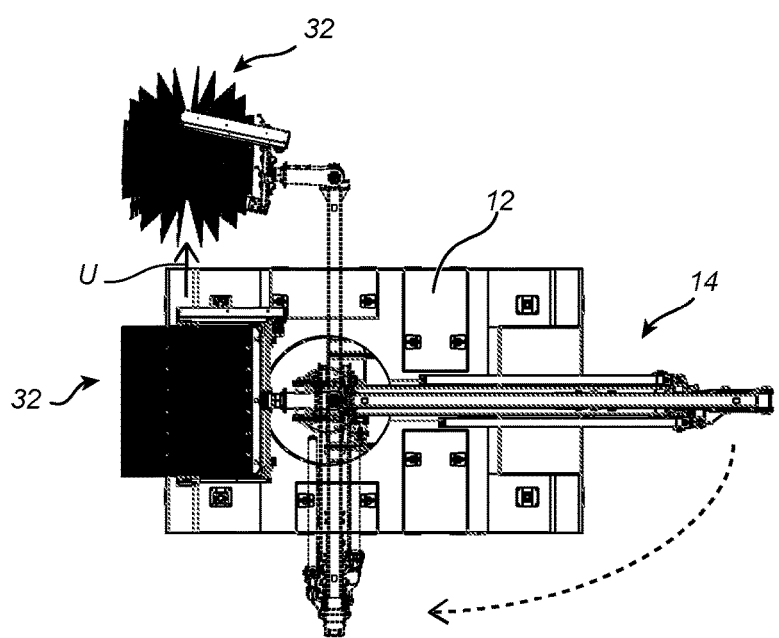
FIG. 6C is a diagrammatic top view of the aircraft cleaning robot, positions, and trajectory of FIG. 6A.

FIGS. 6A-C illustrate, in three orthogonal projections, the cleaning robot 10 as it unfolds the robot arm 14 from a collapsed transport position (solid lines) to a cleaning start position (dashed lines) adjacent to the surface to be cleaned 73 (FIG. 3). As such unfolding may be repeated multiple times while cleaning an aircraft 68, since the aircraft cleaning robot 10 may be moved between different sections of the aircraft 68 to be cleaned, unfolding and collapsing the aircraft cleaning robot 10 may represent a substantial portion of the total cleaning time. Therefore, the aircraft cleaning robot 10 provides an automated unfolding program, according to which the aircraft cleaning robot 10 simultaneously operates the arm swivel joint 18 and the first and second pivot joints 22, 28. While operating the joints 18, 22, 28, the controller 56 (FIG. 2) moves the cleaning head 32, based on predetermined instructions stored in the memory 58, along the shortest path, illustrated in each projection by solid arrows U, from its position when the robot arm 14 is collapsed, to the cleaning start position illustrated in broken lines. As is illustrated in FIGS. 6A-C, also the third pivot joints 38 and the brush swivel joint 39 (FIG. 1) may be operated according to the unfolding program to obtain a cleaning start position having a desired brush angle. The unfolding program is initiated based on operator input from the remote-control panel (FIG. 1), and requires the deadman's switch 78 (FIG. 1) to be engaged while moving the robot arm 14.

The memory 58 (FIG. 2) stores a plurality of sets of predetermined instructions, for generating a plurality of different unfolding paths, depending on the operator's selection of which aircraft type and which segment of the aircraft is to be cleaned. For some aircraft segments, the predetermined path may also comprise moving the cleaning head 32 along a path which is not the shortest path, to avoid e.g. aircraft wings and other structures which may lie between the cleaning head's 32 transport position and the desired cleaning start position. The program may also comprise instructions for moving each pivotal joint along a respective path predetermined to avoid that the robot arm 14 hits any portion of the aircraft 68 (FIG. 4). The unfolding program may be executed based on the assumption that the mobile carrier 12 has been positioned at a predetermined cleaning start location in relation to the aircraft segment (LF, LR) (FIG. 4) to be cleaned.

Figure 7:
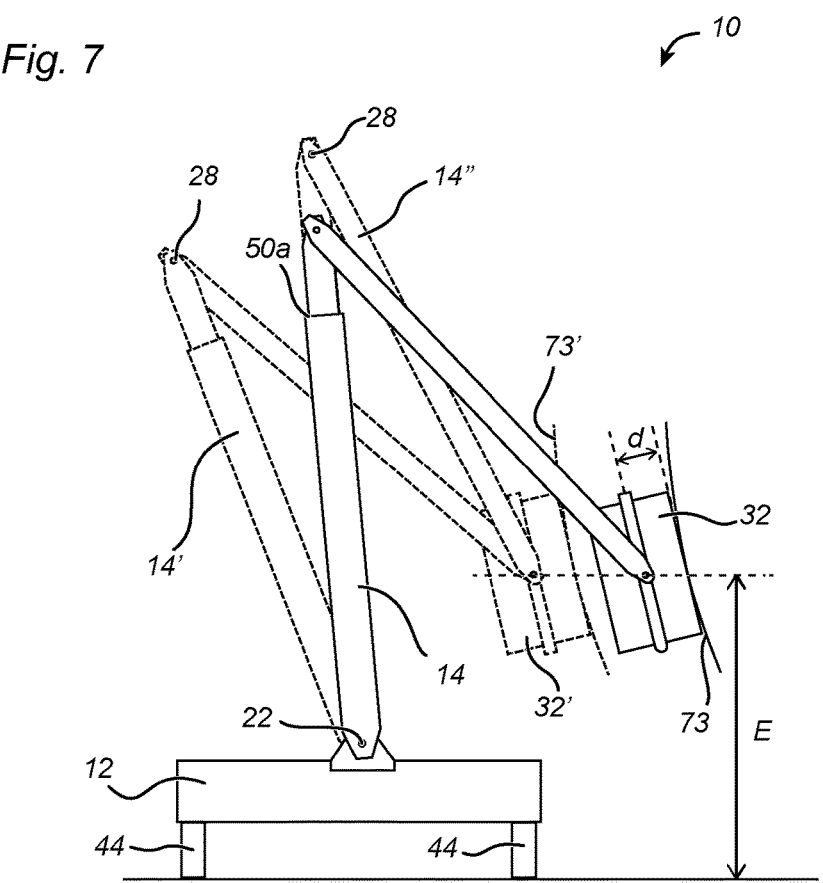
FIG. 7 is a schematic front view of the cleaning robot of FIG. 1 with the robot arm illustrated in three different positions.

FIG. 7 illustrates the aircraft cleaning robot 10 as seen from the front, while cleaning the aircraft 68. As already suggested hereinbefore, signals from the probes 42a-42c (FIG. 1), and in particular, the signal from the centre probe 42b, indicate to the controller 56 (FIG. 2) the radial distance d between the aircraft surface 73 and the brush rotation axis R (FIG. 1), which also provides an indication of the brush engagement pressure onto the surface 73. Should the distance d change, the controller 56 is configured to automatically control the robot arm 14 to compensate for the change. Such changes may be due to, e.g., misalignment between the travel direction of the mobile carrier 12 and the longitudinal direction L (FIG. 5) of the aircraft 68, or longitudinal variations in the shape of the surface 73 being cleaned. For minor changes, the third pivot joint 38 (FIG. 1) may be controlled to return the distance d to a predetermined cleaning distance. However, for larger changes in distance d which move the pivot angle of the third pivot joint 38 outside a predetermined angle range, the first pivot joint 22 is operated to maintain the distance d at the predetermined cleaning distance. FIG. 7 illustrates the robot arm 14 in solid lines prior to such an operation. However, pivoting the first pivot joint 22 changes also the elevation E of the cleaning head 32. In order to maintain the cleaning head 32 at a constant elevation E, while still engaging with the surface to be cleaned now positioned at position 73', the second pivot joint 28 is operated together with the first pivot joint 22, bringing the robot arm to the position 14' illustrated in broken lines.

As the system is overdetermined, the robot arm 14 is capable of maintaining the distance d and elevation E in several different ways. As an alternative to operating the first and second pivot joints 22, 28, the controller 56 can instead operate the first telescopic joint 50a together with the second pivot joint 28, bringing the robot arm to the position 14". Even though not illustrated, the cleaning head position 32' can also be reached by e.g. operating the arm swivel joint 18. The controller 56 is configured to select a combination of joints to operate based on a set of predetermined disallowed robot arm positions, which in turn is determined by the mobile carrier's 12 position relative to the aircraft 68.

Figure 8A:
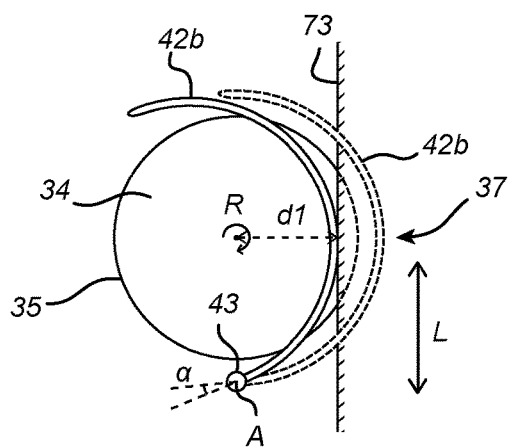
FIG. 8A is a schematic view in section of a cleaning head of the aircraft cleaning robot of FIG. 1.

FIG. 8A is a section of the cleaning head 32 perpendicular to the brush rotation axis R, and illustrates the cleaning head 32 with the second, central, probe 42b in two different positions. Broken lines illustrate the probe 42b in a rest position, to which position it is biased when not engaging with a surface 73 to be cleaned. The probe 42b is also illustrated in solid lines, in a position where it has been pressed into the brush 34 by the surface 73 to be cleaned. As the brush 34 gradually engages with the surface 73 to be cleaned, and the probe 42b is thereby gradually pressed into the brush 34, the probe 42b pivots an angle α about the probe pivot axis A (FIG. 1). The pivot angle α is detected by an angle sensor (not illustrated) at the pivot joint 43, and a value representative of the pivot angle α is provided to the controller 56 (FIG. 2). It will be appreciated that the first and third probes 42a, 42c (FIG. 1) operate in the same manner. The value provided to the controller 56 is also representative of the shortest radial distance d1 between the brush rotation axis R and the surface 73 to be cleaned. Thereby, when rotating the brush 34 about its axis R, the value is also representative of the engagement pressure of the brushing face 35 against the surface 73 being cleaned.

Figure 8B:
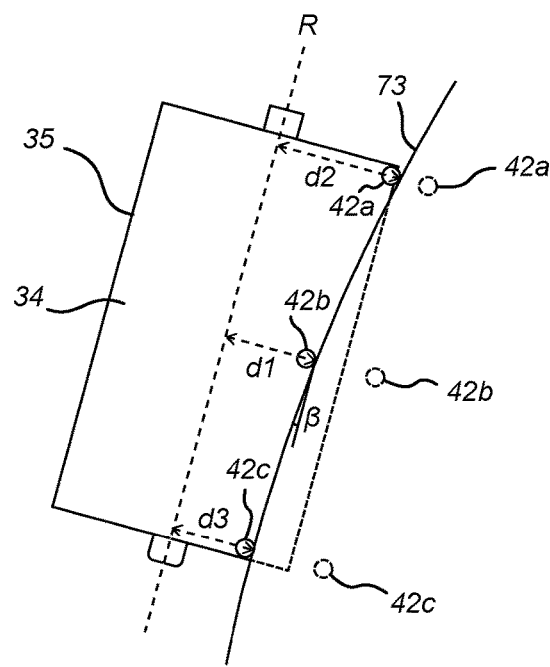
FIG. 8B is a schematic view in another section of the cleaning head of FIG. 8A.

FIG. 8B illustrates the two cleaning head positions of FIG. 8A in a section along the brush rotation axis R, and perpendicular to the longitudinal direction L (FIG. 8A). In the view of FIG. 8B, the brush rotation axis R is inclined relative to the surface 73 to be cleaned, such that the first and third, axially outermost, probes 42a, 42c are not pressed the same distance into the brush 34. When engaging with the surface 73 to be cleaned, the shortest radial distance d2 between the first probe 42a and the surface 73 to be cleaned is greater than the shortest radial distance d3 between the third probe 42c and the surface 73 to be cleaned. The difference in radii d2-d3 is representative of an approximation of the angle of engagement β between the brushing face 35, defined as the outer contour swept by the bristle ends of the brush 34 when it rotates freely without engaging with the surface 73 to be cleaned, and the surface to be cleaned 73. In the embodiment illustrated in the enclosed figures, the brushing face 35 is parallel to the brush rotation axis R, such that the brush engagement angle β corresponds to the angle between the brush rotation axis R and the surface 73 to be cleaned; this may be different for e.g. a non-cylindrical brush.

Based on the detected brush engagement angle β, approximated by the difference d2-d3, the controller operates the brush swivel joint 39 to minimize the brush engagement angle β, i.e. to align the brush 34 with the surface 73 to be cleaned.

The controller 56 also uses the signal from the probes 42a-c for controlling the brush engagement pressure applied by the brush 34 onto the surface to be cleaned 73. While the difference in radii d2-d3 may serve as input in a control loop for controlling the brush engagement angle β as described above, the sum of radii d1+d2+d3 is representative of how hard the brushing face 35 is pressed against the surface to be cleaned 73, and may serve as input in a control loop for controlling the brush engagement pressure. In the illustrated situation, the controller 56 determines, based on input from the probes 42a-c, that the cleaning face 37 of the cleaning head 32 faces and abuts the surface 73 to be cleaned. In response, the controller 56 may adjust the brush engagement pressure by operating the robot arm 14; by way of example, referring back to FIG. 1, the controller may operate the third pivot joint 38 to maintain the sum d1+d2+d3 within a pre-set interval. Alternatively, the controller 56 may determine in which direction to apply pressure without input from the probes 42a-b, since the cleaning direction in which to apply pressure is implicitly determined by the direction in which the cleaning face 37 of the cleaning head 32 faces, and this direction may be determined based on position information from each of the joints 18, 22, 28, 38, 39, 50a, 50b of the robot arm 14. Instead of using the probes 42a-c for determining the brush engagement pressure, the brush engagement pressure may, by way of example, be detected by detecting a torque in the third pivot joint 38. Hence, the probes 42a-c are not necessary for controlling the brush engagement pressure.

Referring back to FIG. 4, the cleaning head 32 is configured to follow a predetermined route, such as the left front path PLF, along the surface of the aircraft 68. At each of a plurality of sample points along the route, the controller 56 records a cleaning data record comprising the detected brush engagement pressure, along with the brush engagement duration time for each respective point. The controller 56 stores the cleaning data records to a non-volatile computer memory, thereby allowing verification, after completion of the cleaning program, that all parts of the aircraft 68 have been sufficiently cleaned.

Figure 9A:
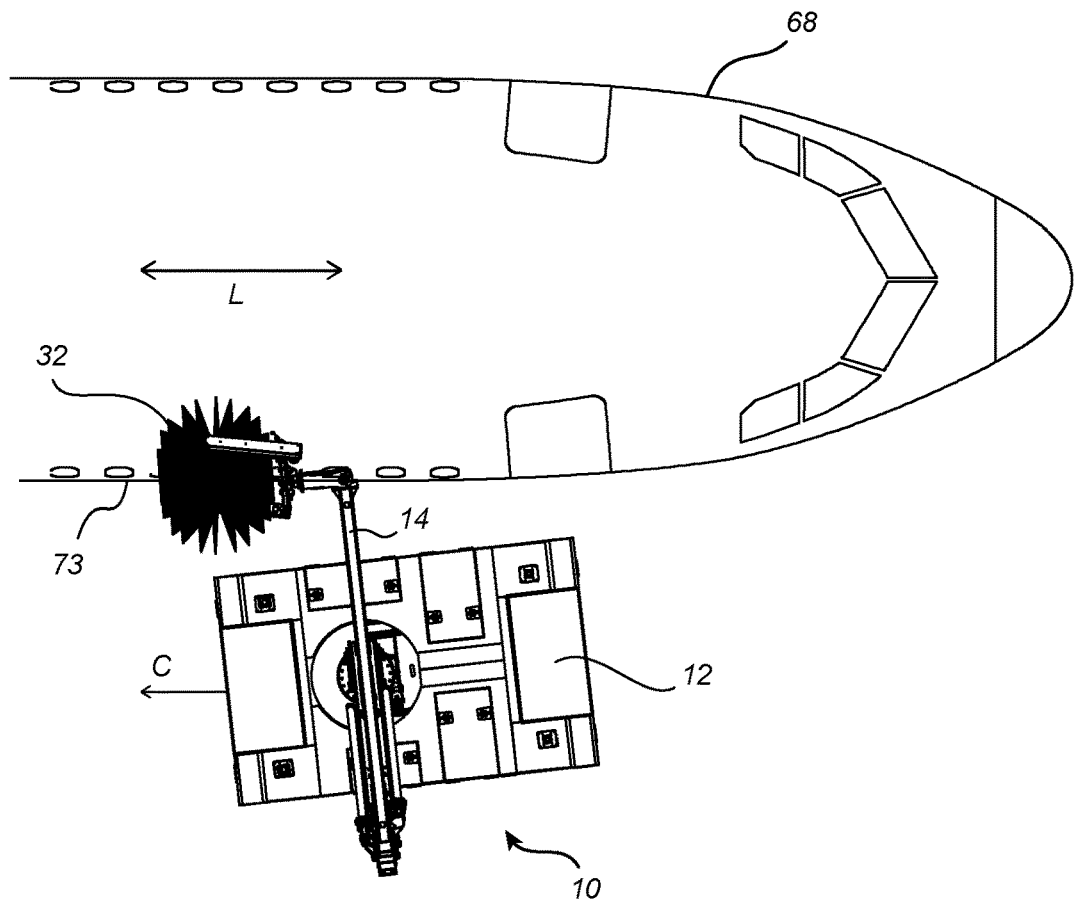
FIG. 9A is a schematic top view of the aircraft cleaning robot of FIG. 1 while cleaning an aircraft.

FIG. 9A illustrates the aircraft cleaning robot 10 in substantially the same position as that illustrated in FIG. 3, but as seen from above. However, the situation of FIG. 9A differs from that illustrated in FIG. 3 in that the mobile carrier 12 is not aligned with the longitudinal axis L of the aircraft 68 to be cleaned. This may happen, for example, if the aircraft cleaning robot 10 is not accurately positioned alongside the aircraft 68 before cleaning is started. In order to alleviate the problem, both wheel pairs, i.e. the pair of front wheels 44a (FIG. 1) as well as the pair of rear wheels 44b, are steerable. As the mobile carrier 12 drives along the aircraft 68, the controller 56 receives control input from the robot arm 14 and/or the cleaning head 32, indicating to the controller 56 whether the mobile carrier 12 approaches or moves away from the surface 73 to be cleaned. Based on the control input, the controller 56 controls the steering angle of both the front and rear wheel sets 44a, 44b to follow a course C parallel to the longitudinal axis L, or at least parallel to the surface to be cleaned 73, thereby maintaining a constant distance between the mobile carrier 12 and the aircraft 68.

Figure 9B:
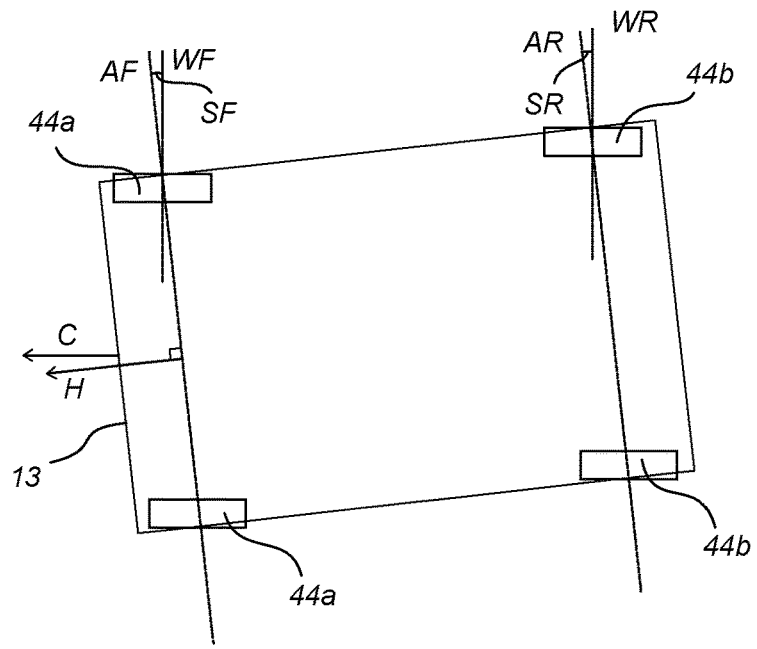
FIG. 9B is a schematic illustration of a wheel position of the aircraft cleaning robot in the situation illustrated in FIG. 9A.

FIG. 9B schematically illustrates the control of the front and rear wheels pairs 44a, 44b with all other components of the aircraft cleaning robot 10 removed for clarity. Each wheel pair 44a, 44b defines a respective wheel axle, such that the front wheels 44a together define a front wheel axle AF, and the rear wheels 44b together define a rear wheel axle AR. The wheel axles AF, AR need not be physical, i.e. defined by respective shafts; the term axle should rather be seen in a functional sense. Each front wheel 44a is rotatable about a respective front wheel rotation axis WF, and each rear wheel 44b is rotatable about a respective rear wheel rotation axis WR. The steering angle of each wheel 44a, 44b is defined as the angle SF, SR between the rotation axis WF, WR of the respective wheel 44a, 44b, and the respective wheel axle AF, AR. The heading H of the mobile carrier 12 is defined as the direction in which the front 13 of the mobile carrier 12 faces, along a horizontal direction perpendicular to the front wheel axle AF. The controller 56 is configured to, based on the control input, steer each of the front and rear wheel pairs 44a, 44b in the same direction, and to substantially the same respective steering angle SF, SR, thereby allowing the mobile carrier to follow a straight course C which is different from the heading H. This manner of steering is typically referred to as crab steering.

Figure 10A:
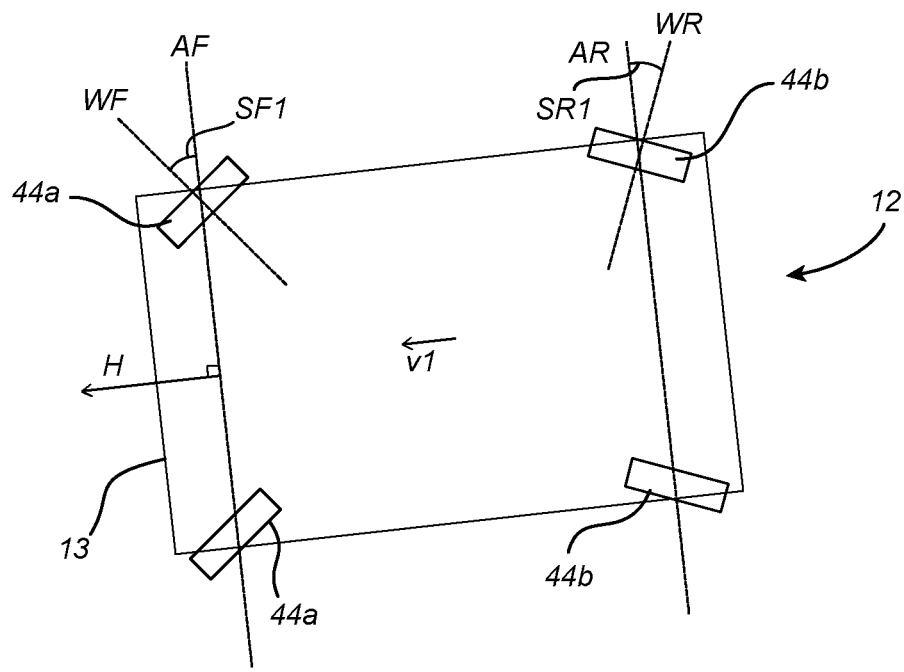
FIG. 10A is a schematic top view of the aircraft cleaning robot of FIG. 1 while driving at a first speed.
Figure 10B:
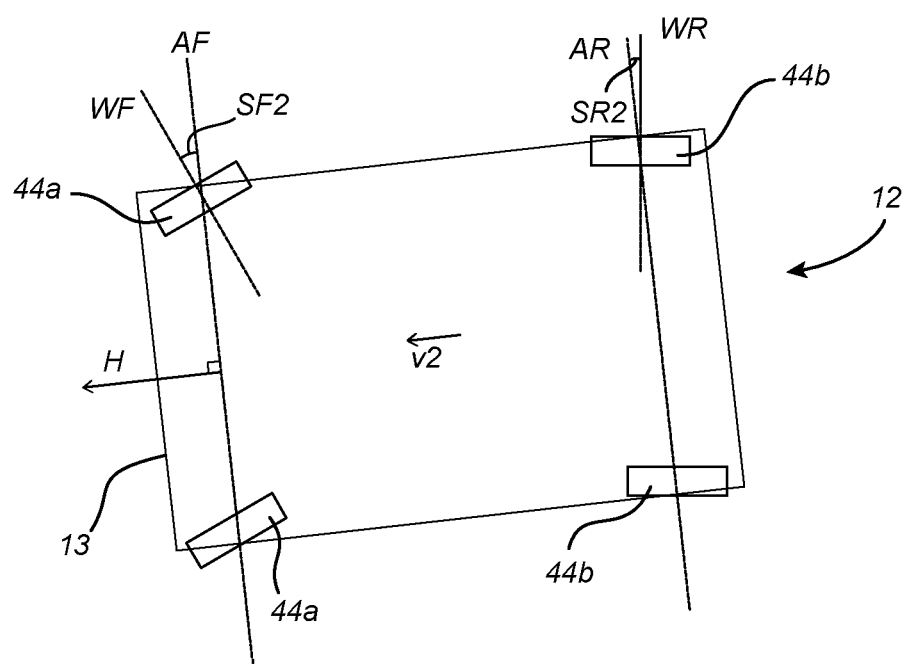
FIG. 10B is a schematic top view of the aircraft cleaning robot of FIG. 1 while driving at a second speed.

In other situations, such as when driving the mobile carrier between different aircraft segments LF, LR (FIG. 4) to be cleaned, the controller may be configured to steer the front wheels 44a and rear wheels 44b to different steering angles SF, SR, which may be in opposite directions, i.e. of opposite signs. This may increase the manoeuvrability of the mobile carrier 12. FIG. 10A illustrates the mobile carrier 12 driving at a first, relatively lower speed v1, in a situation where an operator generates a certain steering input signal via the joystick 74 of the remote-control panel 46 (FIG. 1). Based on the steering input signal, the controller 56 generates wheel steering control signals to set the respective steering angles SF1, SR1 of the front and rear wheel pairs 44a, 44b. FIG. 10B illustrates the mobile carrier 12 in the same situation, receiving the very same steering input signal from the joystick 74, but when driving at a relatively higher speed v2. At the higher speed of FIG. 10B, the front wheel steering angle SF2 is smaller than the front wheel steering angle SF1 of FIG. 10A, for the same steering input signal.

Similarly, at the higher speed of FIG. 10B, the rear wheel steering angle SR2 is smaller than the rear wheel steering angle SR1 of FIG. 10A, for the same steering input signal. Moreover, when increasing the speed, the proportionality factor between steering input signal and steering angle SF, SR is reduced more for the rear wheels 44b than for the front wheels 44a. Expressed differently, for v2>v1, the following conditions are satisfied for a given steering input signal:

SF1>SF2;
SR1>SR2; and
SF2/SF1>SR2/SR1, where SF1 and SR1 are the front and rear wheel steering angles at speed v1, and SF2 and SR2 are the front and rear wheel steering angles at speed v2.

Figure 11:
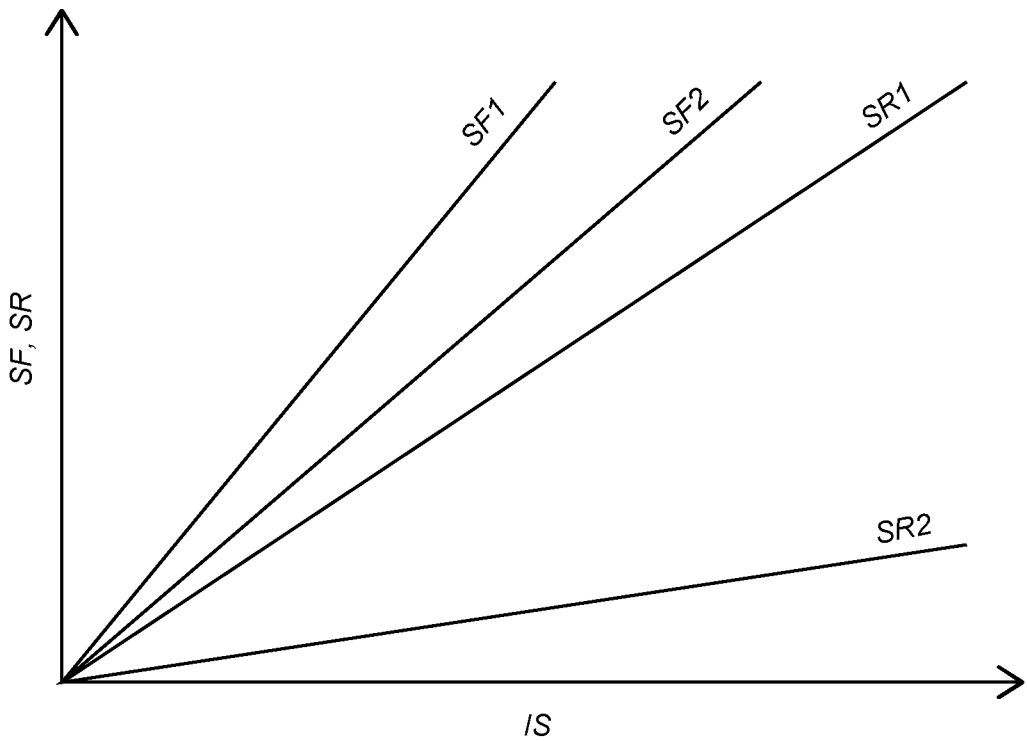
FIG. 11 is a chart illustrating a relation between a steering signal, a speed, and front and rear wheel steering angles of the aircraft cleaning robot of FIG. 1.

FIG. 11 schematically illustrates the general relation between steering input signal magnitude IS from the joystick 74 (FIG. 1) and the respective sets of steering angles SF1, SR1 and SF2, SR2 for the two different speeds v1, v2.

Figure 12:
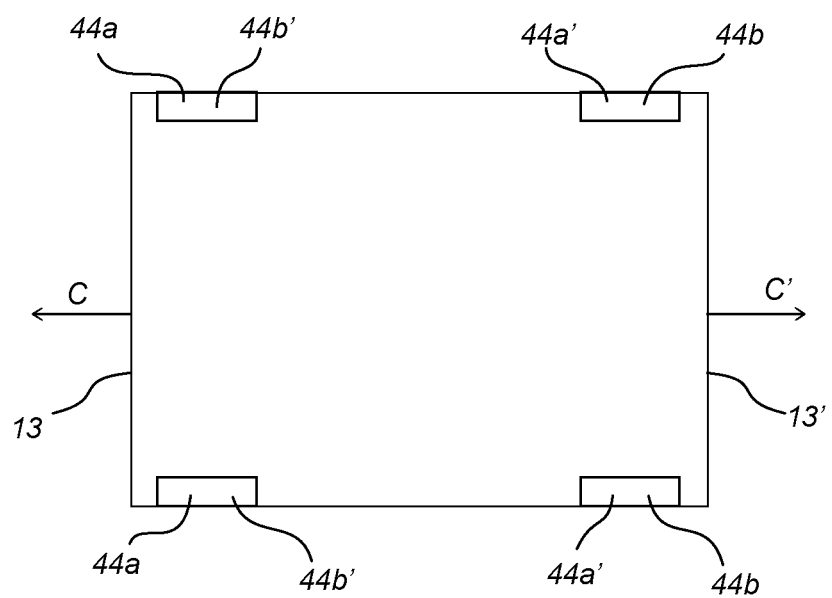
FIG. 12 is a diagrammatic top view of the aircraft cleaning robot of FIG. 1.

The front and rear wheel pairs 44a, 44b are steerable to a similar extent, and the overall geometry of the mobile carrier 12 is substantially symmetrical. Now with reference to FIG. 12: In order to obtain similar steering characteristics regardless of whether the mobile carrier 12 is driven in a forward direction, illustrated by the course C, or a backward direction illustrated by the course C', the controller 56 is configured to determine a present driving direction, and based on the driving direction, determine which of the wheel pairs 44a, 44b presently acts as front wheels, and which of the wheel pairs 44a, 44b presently acts as rear wheels, respectively. The controller 56 is configured to generate a front wheel steering signal to the wheel pair 44a (in the case of course C), 44a' (in the case of course C') presently acting as front wheels, and a rear wheel steering signal to the wheel pair 44b, 44b' presently acting as rear wheels, wherein the generation of the front wheel steering signal is based on a front wheel conversion function from steering input signal IS to front wheel steering angle SF, and the generation of the rear wheel steering signal is based on a rear wheel conversion function from steering input signal IS to rear wheel steering angle SR. The front wheel conversion function and rear wheel conversion function may be different, and may be as illustrated in FIG. 11.

Referring back to FIGS. 6A-6C, the robot arm 14 is movable between a collapsed transport position (illustrated in solid lines) and an extended working position (broken lines). Position sensors monitor the positions of each of the joints 18, 22, 28, 38, 39, 50a, 50b of the robot arm 14, and the controller 56 is configured to determine, based on the positions of the joints, whether the robot arm 14 is in the transport position. When in working position, the controller 56 sets a first, relatively lower, limit speed for driving the mobile carrier 12, thereby reducing the risk that careless driving may cause the aircraft cleaning robot 10 to topple over. When in transport position, the controller sets a second, relatively higher, limit speed, such that the aircraft cleaning robot 10 can speedily be moved between the aircraft segments to be cleaned. The respective limit speeds define the maximum speeds at which a user can drive the mobile carrier 12 with the robot arm 14 in the respective positions.

Similarly, the controller 56 is configured to adjust also the steering behaviour based on whether the robot arm 14 is in the working position or the transport position. When in working position, the controller 56 sets a first, relatively smaller, steering angle limit for each of the front and rear wheel pairs 44a, 44b, i.e. the controller 56 sets a first, relatively smaller, maximum value for the steering angles SF, SR (FIG. 9B). When in transport position, the controller sets a second, relatively larger, steering angle limit for each of the front and rear wheel pairs 44a, 44b, thereby maximizing the agility of the aircraft cleaning robot during transport and positioning prior to cleaning.

Figure 13:
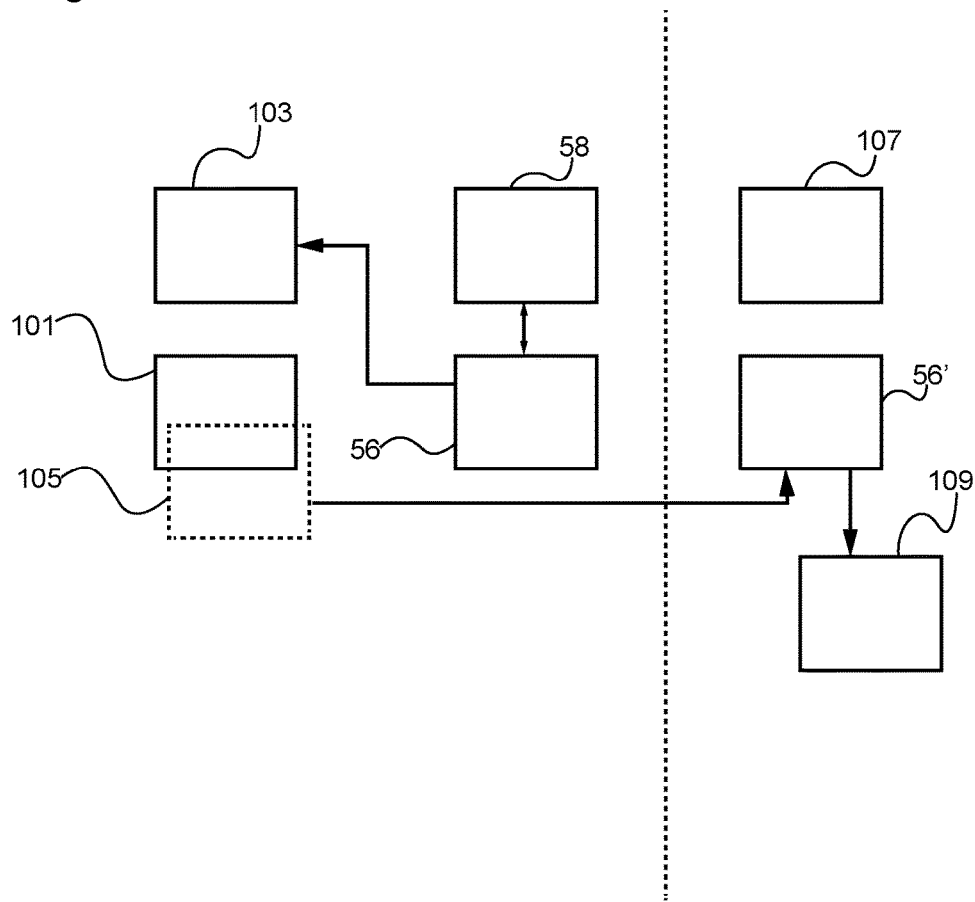
FIG. 13 is a schematic illustration of a further development of the control system illustrated in FIG. 2.

FIG. 13 schematically illustrates a further developed control system configuration that may provide improved reliability of operation, and that may generally be applied to the control system of FIG. 2.

This control system involves a two-layered approach where a first controller 56 in a basic layer acquires sensor data from sensors 101 and provides control signals to different actuators and motors 103 as previously described. Thus, the first controller 56 controls the position of the cleaning head 32 relative to the mobile carrier 12 inter alia by operating the robot arm 14, cf. FIG. 1. The first controller 56 further drives the mobile carrier 12 to various positions along the aircraft while cleaning it. Therefore, the first controller 56 carries out all functions needed to perform cleaning. The first controller 56 thus operates based on data from a first set of sensors 101 and optionally using a memory.

In a higher layer, a second controller 56' is employed. This controller monitors the actions carried out by the first controller 56 and serves to identify upcoming possibly dangerous situations, and to influence the first controller 56 to avoid such situations. The second controller 56' thus monitors the robot arm 14 and the cleaning head 32 based on data from a set of sensors 105 which may be wholly or partly different from the set of sensors 101 used by the first controller 56. The second controller 56' uses a measured combination of sensor data, and determines if the measured combination corresponds to a combination of data implying a risk. If this is the case, the second controller 56' may disable or reverse control actions of the first controller 56.

Needless to say, the first and first and second controllers 56, 56' may be devised as different blocks of software being executed on a single processing device. Generally, the first controller 56 may carry out control with high precision based on very accurate sensors in the first set of sensors 101. In order to keep costs for such sensors reasonable, an additional the second controller 56' employs sensors 105 with high reliability rating, e.g. military grade, that need not be capable of actually controlling the robot, only to make sure that the robot does not cross a boundary to an unsafe state. The second controller 56' may also partly use data from the first set of sensors 101.

Detection of unsafe conditions may be carried out by the second controller 56' based on feeding sets of sensor data to a lookup table 107 that simply outputs safe/unsafe as a response. Needless to say, unsafe conditions may also be detected based on single sensor data, for instance if it is detected that the robot begins to topple over or if a joint torque exceeds a threshold value. By way of example, the second controller 56' may be configured to identify an unsafe condition based on input from a torque sensor located at the first robot arm pivot joint 18 (FIG. 1), measuring the torque about the first pivot axis P1. Such a torque sensor may e.g. be configured as a pressure gauge measuring the hydraulic pressure in the first hydraulic cylinder 24.

Should the second controller 56' detect an unsafe state the first controller 56 may be disabled to avoid moving further from the safe/unsafe boundary. The first controller 56 may also be instructed by the second controller 56' to reverse the last steps leading to the unsafe condition. Subsequently, the first controller 56 may determine an alternative way to carry out the desired function that had led to the unsafe condition, e.g. moving the robot 10 closer to or further away from the aircraft 68 and compensating this movement with the robot arm 14.

Additionally, an unsafe condition may be reported to the user supervising the robot by providing an indication 109, e.g. via the remote-control panel 46 (FIG. 1), as a temporary unsafe condition may indicate for instance a malfunctioning sensor of the first controller 56.

The second controller 56' may interfere with the first controller 56 only in case of an unsafe combination, otherwise being passive. It is however possible to provide an indication 109 in the form of a report illustrating how close to safe/unsafe boundaries the robot operates, even if the second controller 56' does not interfere with the first controller 56.

Figure 14:
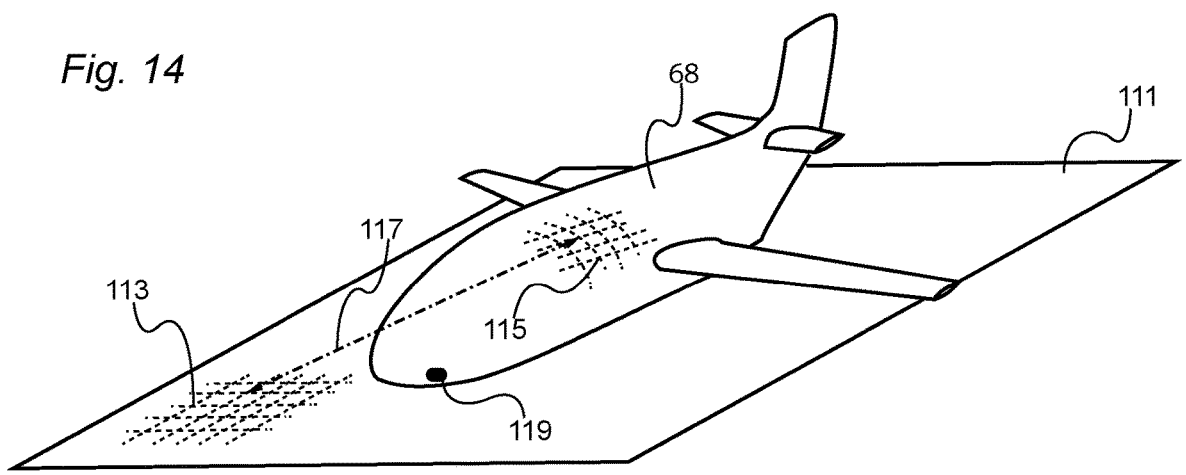
FIG. 14 is a schematic view in perspective of an aircraft parked on a base plate.

Another solution is related to how the robot 10 determines how to find the aircraft 68, determines where on the aircraft to carry out cleaning, and how to verify that a desired cleaning program has been carried out. Although it would be possible to devise the robot 10 with cameras and image analysis algorithms that allow the robot to simply find a generic aircraft, identify fuselage and wings, etc., and carry out a cleaning sequence, cameras are generally sensitive to the wet and dirty conditions of a cleaning situation. Hence, a more structured approach may be preferred, and will be described with reference to FIG. 14.

First of all, the base plate 111 on which the robot operates can define a first coordinate system 113. The base plate is most likely flat and any location on the base plate may then be defined using two parameters, although the base plate could much conceivably also be defined in three dimensions for instance to allow a slope towards a drain, etc. In any case, the controller 56 may receive a first set of data corresponding to a coordinate system 113 of the base plate 11. Then, the robot may determine its position and orientation in this coordinate systems using a positioning device as is well known per se, for instance using an RTK-, real time kinematics, system. This may be done for the robot 10 as a whole, and particularly for the cleaning head 32 thereof.

Aircraft 68, particularly airliners, are highly standardized and regulated, and the robot can receive or read a second set of data relating to a precise geometry of the aircraft type to be cleaned, typically corresponding to a coordinate system 115 describing the envelope surface thereof, including areas to be cleaned and areas where no cleaning is to be carried out, for instance.

The controller may further receive a third set of data 117 corresponding to the relation between the coordinate system 113 of the base plate 111 and the coordinate 115 system of the aircraft 68. Typically, this data 117 describes the aircraft's 68 location in the coordinate system 113 of the base plate 11 and its orientation in the same.

Based on these first, second and third sets of data, the robot controller 56 moves the mobile carrier 12 and the robot arm 14, c.f. FIG. 3, to make the cleaning head 32 carry out a cleaning sequence in an efficient manner. During this sequence, it is possible to log engagement time and engagement force of the cleaning head 32 for every cleaned portion of the aircraft envelope surface, which may be provided as a report, for instance to schedule additional cleaning sequences. It is further possible to provide the cleaning head with a camera (not shown) and carry out a safety inspection of the aircraft envelope surface during cleaning or, which may be preferable considering the dirty conditions during cleaning, preceding or subsequent to cleaning.

The above mentioned third data relating to the relation between the aircraft geometry and the base plate geometry may be provided by means of the location of a reference object 119 attached to the aircraft. Such a reference object may be a radio transmitter, although other reference objects are conceivable such as optical markers and the like.

One option that makes possible both determining the third data and subsequent navigation of the robot and steering of the cleaning head 32 is to employ real time kinematics, RTK, sensors and base stations. One such is sensor may then be located at the cleaning head 32, and base station receiver-/transmitters may be attached to the aircraft 68 and a reference location of the base plate 111.

Another option that allows determining the third data is to drive the mobile carrier 12 along the aircraft, while cleaning the aircraft using the brush 34, wherein the controller is configured to follow the aircraft surface with the brush 34, e.g. as described in detail hereinabove; and based on the detected shape of the aircraft 68, determine the exact position of the aircraft 68 relative to the cleaning robot 10.

The inventive concepts herein have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An aircraft cleaning robot comprising:
   a robot arm having a proximal end attached to a mobile carrier, and a distal end provided with a cleaning head comprising a brush for brushing an aircraft to be cleaned, wherein the brush is rotatably attached to the robot arm to be rotated about a brush rotation axis and the robot arm comprises a first joint and a second joint; and
   a controller configured to control the position of the cleaning head;
   wherein the aircraft cleaning robot is configured to automatically orient the brush such that a cleaning face of the cleaning head is aligned with the surface being brushed;
   wherein the controller is further configured to:
      based on input from a detector or a sensor coupled to the robot arm and/or cleaning head or a representation of a present position of the robot arm joints in the controller, determine a cleaning direction in which the cleaning face is presently facing;
      based on the determined cleaning direction, operate the robot arm along the cleaning direction to apply a brush engagement pressure in said cleaning direction;
      control the position of the cleaning head relative to the mobile carrier by operating the robot arm;
      drive the mobile carrier along an aircraft to be cleaned, while cleaning the aircraft;
      detect a change of distance between the mobile carrier and the aircraft;
      based on said detected change of distance, operate one of said first and second joints to maintain a desired cleaning engagement pressure between the cleaning head and the aircraft; and
      operate the other of said first and second joints to maintain an elevation of the cleaning head.

2. An aircraft cleaning robot comprising:
   a robot arm having a proximal end attached to a mobile carrier, and a distal end provided with a cleaning head comprising a brush for brushing an aircraft to be cleaned, wherein the brush is rotatably attached to the robot arm to be rotated about a brush rotation axis; and a controller configured to control a position of the cleaning head;
wherein the aircraft cleaning robot is configured to automatically orient the brush such that a cleaning face of the cleaning head is aligned with a surface of the aircraft being brushed;
wherein the controller is further configured to:
based on input from a detector or a sensor coupled to the robot arm and/or cleaning head or a representation of a present position of the robot arm joints in the controller, determine a cleaning direction in which the cleaning face is presently facing;
based on the determined cleaning direction, operate the robot arm to move the cleaning head along the cleaning direction to apply a brush engagement pressure in said cleaning direction on the surface of the aircraft by the cleaning head; and
detect a detected brush engagement pressure, and/or a detected brush engagement time during which the brush engagement pressure is detected at each of a plurality of positions of the cleaning head on the surface of the aircraft to be stored as cleaning data for the aircraft.

3. The aircraft cleaning robot according to claim 1, wherein the controller is configured to
control the position of the cleaning head relative to the mobile carrier by operating the robot arm, and to
drive the mobile carrier along an aircraft to be cleaned, while cleaning the aircraft,
wherein the controller is configured to
receive a distance signal indicating a change of distance between the mobile carrier and the aircraft; and
based on the received distance signal, steer the mobile carrier to maintain a constant distance between the mobile carrier and the aircraft.

4. The aircraft cleaning robot according to claim 3, wherein the cleaning head and the mobile carrier are interconnected via a set of robot arm segments and a set of joints, wherein the distance signal is based on the position of at least one joint of said set of joints.

5. An aircraft cleaning robot comprising:
a mobile carrier;
a robot arm having a proximal end attached to the mobile carrier, and a distal end provided with a cleaning head, wherein the robot arm has at least a first arm segment, which is connected to the mobile carrier via a first pivotal joint, and a second arm segment, which is connected to the first arm segment via a second pivotal joint;
a user interface; and
a controller configured to control the position of the cleaning head by operating the robot arm, wherein the controller is configured to:
receive a control input provided by an operator via a user interface, the control input indicating a desired movement direction of the cleaning head relative to a pair of orthogonal axes of the user interface, the pair of orthogonal axes of the user interface corresponding to a pair of axes of a coordinate system aligned with the aircraft to be cleaned;
determine, based on said control input and a transfer function, a respective joint movement direction and movement magnitude of each of a set of joints comprising said first and second pivotal joints to generate a movement of the cleaning head in a cleaning head movement direction relative to the pair of orthogonal axes of the coordinate system aligned with the aircraft to be cleaned, the cleaning head movement direction corresponding to the desired movement direction; and
based on the determined joint movement directions and movement magnitudes, simultaneously operate each joint of said set of joints to move the cleaning head in said cleaning head movement direction, thereby enabling simultaneous operation of more than one joint based on a single operator input received as the control input.

6. The aircraft cleaning robot according to claim 5, wherein the determination of the respective joint movement direction and movement magnitude of the joints of the set of joints comprises
determining the present coordinates of the cleaning head based on the transfer function and the present positions of the set of joints;
determining target coordinates based on the control input;
determining a target position of each joint of the set of joints based on the transfer function and the target coordinates; and
determining the respective joint movement direction and movement magnitude of each joint of said set of joints based on the present and target positions of the respective joint.

7. The aircraft cleaning robot according to claim 5, wherein said transfer function is configured to generate said movement of the cleaning head along a substantially straight line.

8. The aircraft cleaning robot according to claim 5, wherein said transfer function is configured to generate said movement of the cleaning head along one of the pair of orthogonal axes of the coordinate system aligned with an aircraft to be cleaned.

9. The aircraft cleaning robot according to claim 5, wherein the controller is configured to, based on an instruction to change the cleaning head's direction of motion, gradually increase a control value determining the pivot speed of a first joint of said set of joints, while gradually decreasing a control value determining the pivot speed of a second joint of said set of joints.

10. The aircraft cleaning robot according to claim 5, wherein said set of joints for simultaneous control further comprises an arm swivel joint between the first pivotal joint and the mobile carrier.

11. The aircraft cleaning robot according to claim 5, wherein at least one of said first and second arm segments is telescopic, defined by at least two respective telescopic subsegments which are interconnected by a telescopic joint.

12. An aircraft cleaning robot comprising
a self-propelled mobile carrier;
a robot arm having a proximal end attached to the mobile carrier, and a distal end provided with a cleaning head, wherein the robot arm has at least a first arm segment, which is connected to the mobile carrier via a first pivotal joint, and a second arm segment, which is connected to the first arm segment via a second pivotal joint;
a sensor coupled to the robot arm and/or the cleaning head; and
a controller configured to control the position of the cleaning head relative to the mobile carrier by operating the robot arm at least partly based on an input from the sensor, and to drive the mobile carrier, wherein the controller is configured to:
automatically move, based on driving instructions stored in a computer memory, the cleaning head in a substantially horizontal direction along the aircraft to perform a first cleaning operation, the first cleaning operation being selected from among at least two of (a) operating the robot arm while cleaning the aircraft, (b) driving the mobile carrier along the aircraft while cleaning the aircraft, or (c) both operating the robot arm and driving the mobile carrier along the aircraft while cleaning the aircraft; and automatically move, based on said driving instructions, the cleaning head in a substantially horizontal direction along the aircraft to perform a second cleaning operation, the second cleaning operation being selected from among said at least two of (a) operating the robot arm while cleaning the aircraft, (b) driving the mobile carrier along the aircraft while cleaning the aircraft, or (c) both operating the robot arm and driving the mobile carrier along the aircraft while cleaning the aircraft, said second operation being different from said first operation.

13. The aircraft cleaning robot according to claim 12, wherein the driving instructions include a predetermined cleaning route of the cleaning head.

14. The aircraft cleaning robot according to claim 12, wherein the controller is configured to:
receive operator input identifying the aircraft type and/or an aircraft segment identity; and
move the cleaning head in the substantially horizontal direction along the aircraft while cleaning based on the operator input.

15. The aircraft cleaning robot according to claim 1, wherein said first joint is a pivot joint, and said second joint is a pivot joint, a swivel joint, or a telescopic joint.

16. The aircraft cleaning robot according to claim 1, wherein the controller is configured to
control the position and orientation of the cleaning head, wherein the cleaning head is provided with a brush engagement angle detector configured to detect a brush engagement angle between a brushing face of the brush and the surface being brushed; and
the controller is configured to control the orientation of the cleaning head based on the detected brush engagement angle.

17. The aircraft cleaning robot according to claim 16, wherein the brushing face faces in radial direction of the brush rotation axis.

18. The aircraft cleaning robot according to claim 16, wherein the brush engagement angle detector comprises at least two distance sensors which are axially separated with respect to the brush rotation axis.

19. The aircraft cleaning robot of claim 2, further comprising a probe coupled to the cleaning head and configured to actuate when the cleaning head contacts the surface of the aircraft;
wherein the controller is configured to detect the detected brush engagement pressure and/or the detected brush engagement time from the probe.

* * * * *